US006714901B1

(12) United States Patent
Cotin et al.

(10) Patent No.: US 6,714,901 B1
(45) Date of Patent: Mar. 30, 2004

(54) ELECTRONIC DEVICE FOR PROCESSING IMAGE-DATA, FOR SIMULATING THE BEHAVIOUR OF A DEFORMABLE OBJECT

(75) Inventors: Stéphace Cotin, Antibes (FR); Hervé Delingette, Antibes (FR); Nicholas Ayache, Nice (FR)

(73) Assignee: Inria Institut National de Recherche en Informatique et en Automatique (FR)

( * ) Notice: Subject to any disclaimer, the term of this patent is extended or adjusted under 35 U.S.C. 154(b) by 0 days.

(21) Appl. No.: 09/341,651

(22) PCT Filed: Nov. 13, 1998

(86) PCT No.: PCT/FR98/02428

§ 371 (c)(1),
(2), (4) Date: Jul. 16, 1999

(87) PCT Pub. No.: WO99/26119

PCT Pub. Date: May 27, 1999

(30) Foreign Application Priority Data

Nov. 19, 1997 (FR) ........................................ 97 14506

(51) Int. Cl.[7] ........................................ G06G 7/48

(52) U.S. Cl. ........................ 703/7; 703/6; 703/11; 434/262

(58) Field of Search ........................ 703/7, 6; 434/262; 345/701, 702, 771

(56) References Cited

U.S. PATENT DOCUMENTS

| | | | | |
|---|---|---|---|---|
| 5,389,865 A | | 2/1995 | Jacobus et al. | |
| 5,882,206 A | * | 3/1999 | Gillio | 434/262 |
| 6,054,992 A | * | 4/2000 | Gibson | 345/424 |
| 6,191,796 B1 | * | 2/2001 | Tarr | 345/581 |

FOREIGN PATENT DOCUMENTS

| | | |
|---|---|---|
| GB | 2 298 931 A | 9/1996 |
| WO | WO 96 16389 A | 5/1996 |
| WO | WO 96 18942 A | 6/1996 |
| WO | WO 96 30885 A | 10/1996 |
| WO | WO 97 19440 A | 5/1997 |
| WO | WO 97 31300 A | 8/1997 |

OTHER PUBLICATIONS

"Simplex meshes: a general representation for 3D shape reconstruction", 1994, by H. Delingette, Institut National de Recheerche en Infromatique et en Automatique (INRIA), Technical Report No. 2214, pp. 1–55.*

"Real–time elastic deformations of soft tissues for surgery simulation", by Sephane Coten et al, Octobre 1998, Institut National de Recherche en Informatique et en Automatique (INRIA), Technical Report No. 35111, pp. 1–28.*

–Modeles anatomiques deformables en teps–reel—Aplicaiton a la simulation de chirugie avec retour d'effort [Real–time deformable anatomical models—Application to the simulation of surgery with forth feedback], doctoral thesis by S. Cotin, Nov. 19, 1997.*

The Computer Science and Engineering Handbook, by Allen B. Tucker, Jr. (Editor–in–chief), CRC Press, ISBN: 0–8493–2909–4, 1996: pp. 791–819, 873–891, 1212–1225, 1300–1318, 1319–1353, 1354–1374, 1512–1530.*

Mechanical Engineer's Handbook, Second Edition, by Myer Kutz, Wiley, John & Sons, ISBN 0–471–13007–9, 1998.*

* cited by examiner

*Primary Examiner*—Kevin J. Teska
*Assistant Examiner*—Eduardo Garcia-Otero
(74) *Attorney, Agent, or Firm*—Rabin & Berdo, P.C.

(57) ABSTRACT

An electronic device for processing image data, particularly image data pertaining to medical procedures, includes a user interface with force feedback (4) corresponding to tool reactions, a "collision" module (18) for estimating a point of intersection between a straight line embodying a displacement derived from the action of the tool and a surface mesh of a given object, and an internal forces module (16) which estimates internal forces exerted on nodes of a first part of at least a volume mesh of the object, on the basis of a displacement applied on nodes pertaining to the surface mesh containing a point of intersection, of boundary conditions, and of node tensors and link tensors, from matrices of rigidity, and a reaction module (20) for determining the reaction force of the object corresponding to its deformation estimated on the basis of the internal forces, such that the force generated by the user interface (4) is balanced by reaction force.

42 Claims, 7 Drawing Sheets

FIG. 3
(PRIOR ART)
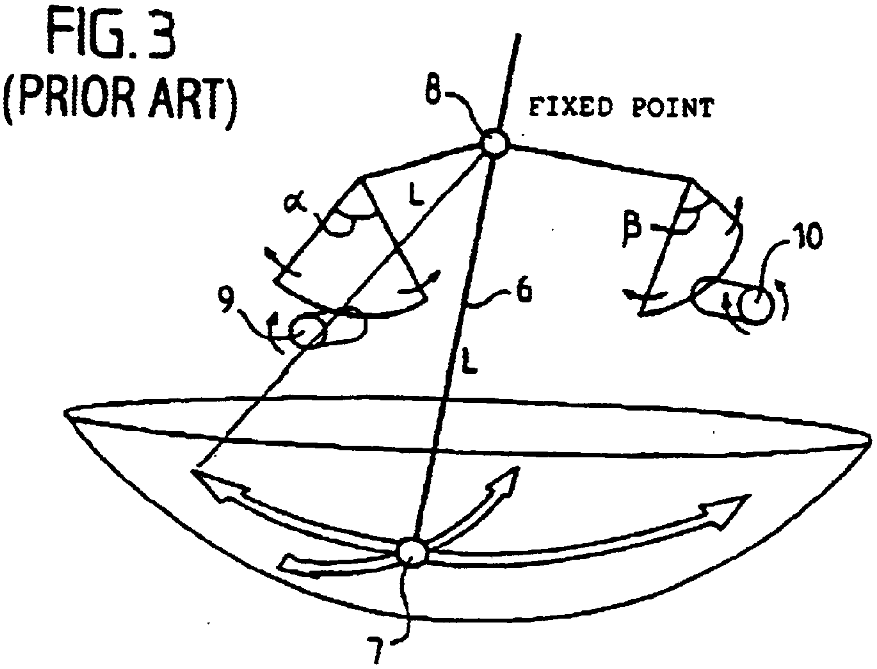
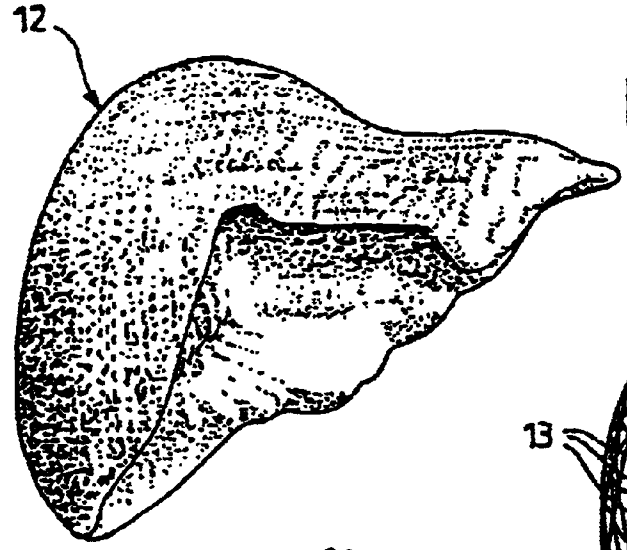
FIG. 4
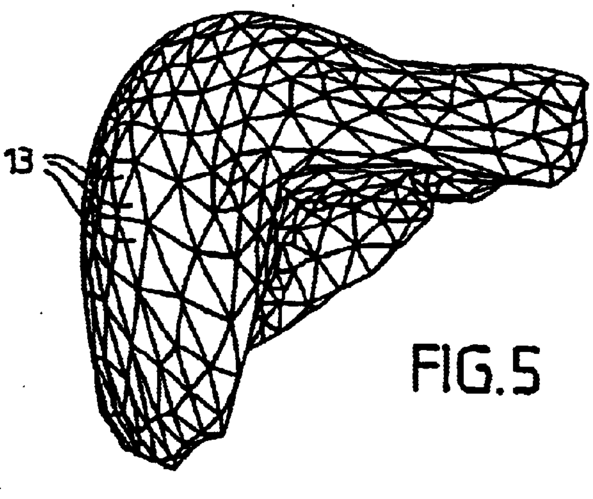
FIG. 5
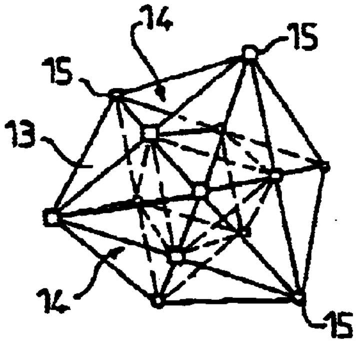
FIG. 6

ELECTRONIC DEVICE FOR PROCESSING IMAGE-DATA, FOR SIMULATING THE BEHAVIOUR OF A DEFORMABLE OBJECT

BACKGROUND OF THE INVENTION

The invention relates to the field of the processing of digital image data from a set representative of a three-dimensional (3D) image, for simulating the deformable behavior of an object.

The invention applies more particularly, but nonexclusively, to the processing of a set of image data from a so-called medical image.

In numerous fields, it is very beneficial to be able to simulate interventions by an operator, with the aid of one or more known tools, on one or more deformable objects. Here, the term intervention is understood to mean either a manipulation, with a view for example to a displacement, or a local transformation, such as for example, in the case of a surgical intervention, incision or extraction of a part of an organ.

Simulation consists in displaying the image of an object and possibly of the region in which it customarily lies, and the representation of one tool at least whose <<virtual>> (in this document, words which appear within double-arrowhead brackets reflect the fact that a concept, in the context of this document, is designated with such words) displacement, relative to the object, is defined by a user interface of which a harness is maneuvered by an operator, with a view to simulating the handling of the said tool. In order to be able to simulate the reaction of the object on the tool, the user interface is capable of generating a force feedback, in accordance with the reactions of the tool. The term reaction force of an object is understood to mean force feedback.

In known devices, a reaction module makes it possible to determine this reaction force of the object on the basis of an estimated deformation of this object. This deformation is obtained with the aid of an internal forces module and of an image refresh module. The internal forces module is capable, on designation of a 3D. object appearing in a set of image data, of establishing a field of internal forces, which is representative of the deformation of the object, between nodes of a volume meshing dependent on a surface meshing of this object, on the basis of a deformation law and of an action defined by the user interface and representative of a maneuver of the tool.

The refresh module then makes it possible to calculate new image data of the object, in the presence of the estimated deformations supplemented with the representation of the tool. These new image data which form the new image of the object and possibly that of the region which surrounds it, are then displayed on a display device so that the operator can see in real time the result of the manipulation of the harness which simulates the action on the tool.

Such a device must allow the training of an operator or else the tailoring of new techniques of intervention on the object. In a field such as surgery, and more particularly still in the field of laparoscopic surgery, this type of device may make it possible to save human lives. To do this, it is imperative that the simulation makes it possible to reproduce the operator's gesture (or in other words his action on a tool, here virtual) as faithfully as possible. This requires real-time processing of the image data, coupled with reconstruction of the forces induced by the object in response to the deformation generated by the <<tool>>.

Now, on account of the calculation techniques used by known devices, estimation of the internal forces requires considerable calculation times which are incompatible with continuous dynamic simulation. In other words, contemporary devices do not make it possible to display, in a manner which is continuous in respect of a human eye, the entire action of a tool on a deformable object.

Moreover, no contemporary device makes it possible to simulate in real time an action such as incision, or tearing, or the removal of material from a deformable object.

SUMMARY OF THE INVENTION

The aim of the present invention is therefore to solve all or some of the aforesaid drawbacks in the field of the processing of digital image data of a 3D object.

It therefore proposes an electronic device for processing image data of the type described in the introduction, in which, on the one hand, there is provision for a <<collision>> module capable of estimating a point of intersection between a straight line embodying a displacement derived from the defined action and the surface meshing, and on the other hand, the internal forces module is devised so as to estimate the internal force exerted on each node of a first part at least of the volume meshing of the object on the basis of the displacement derived from the action, and applied to the nodes belonging to the surface mesh cell containing the point of intersection, of boundary conditions, and of node tensors and link tensors emanating respectively for each node and each link of at least the first part at least, from stiffness matrices specific to each volume mesh cell of at least the first part and dependent on the deformation law.

Of course, the first part of the volume mesh cell to which the above technique is applied, which will subsequently be referred to as <<masses/tensors>>, can be equal to the complete volume mesh cell. In the contrary case (when dealing in fact with a part of this volume mesh cell), the internal forces applied to the nodes of the part complementary to this first part (referred to for example as the second part) are determined on the basis of another technique, such as for example that of finite elements relying on precalculations which are stored so as to allow real-time calculations. Such a technique is taught in particular in the article by S. Cotin, H. Delingette, M. Bro-Nielsen and N. Ayache, <<Geometric and physical representations for a simulator of hepatic surgery>>, published in the proceedings of the conference Medicine meets with virtual reality, January 1996. In what follows, the dual technique of calculating internal forces and the deformation of the object will be referred to as a hybrid model.

This so-called masses/tensors technique used for calculating the internal forces and the deformation of the volume mesh cell of the object permits continuous simulation of an action exerted on a virtual tool at least. It is clear that the smaller the dimension of the first part of the volume mesh cell, the less will be the calculation time.

According to another characteristic of the invention, the device can comprise a meshing module allowing it to designate the 3D object(s) on which the simulation is to be performed by determination of an external envelope, then to decompose this or these envelopes into surface mesh cells, preferably of triangular form, and lastly to decompose the internal volume of each envelope into volume mesh cells on the basis of the corresponding surface meshing so as to provide the volume meshing of the associated object. It is clear that in the preferred case of a triangular surface meshing the volume mesh cells will be tetrahedral in shape.

These shapes are currently preferred since they allow accurate modeling of an object of complex shape. However, of course, other types of meshing may be used.

Such external envelopes and volume mesh cells may be obtained by methods of segmentation (for example by extracting iso-surfaces) and of the Delaunay-Voronoï type respectively. All these methods are well known to the person skilled in the art.

In one embodiment of the device, its internal forces module is capable itself of calculating the stiffness matrices of each volume mesh cell, as well as the node tensors and link tensors.

These calculations are, as was stated earlier, performed on the basis of a deformation law which is preferably of volume linear elastic type. In other words, the force exerted on a node depends on the displacements respectively of this node and of the nodes to which it is connected, relative to their respective positions of equilibrium. Of course, other more complex deformation laws could be used, in particular non-linear laws.

The internal forces module could also be devised so as to determine the internal forces exerted on some at least of the nodes of the first part of the volume meshing on the basis of the deformation law and of auxiliary surface forces dependent on stored, chosen parameters of the object, such as for example the texture of the object, the presence of structures and underlying substructures, etc.

Here, the term auxiliary surface forces should be understood to mean for example surface tensions which, in certain situations such as an incision, will make it possible to amplify a visual effect at display level.

Likewise, the internal forces module may be devised so as to estimate the displacements of the nodes of the volume meshing (at least its first part) on the basis of the displacement derived from the defined action and from external forces, in particular of gravitational force type and/or forces of interaction between objects of one and the same region. This makes it possible to take into account, on the one hand, the partial sagging of an object under its own weight, and on the other hand the presence of neighboring objects and of the ties which exist with these neighboring objects.

Preferably, the estimated displacements of the nodes, other than those of the said surface mesh cell comprising the said point of intersection, are calculated on the basis of the internal forces by successive integrations with the aid of a method chosen from among at least the Euler method and the Runge-Kutta method, and more preferably still by the so-called <<order 4>> Runge-Kutta method. Of course, other methods of integration may be envisaged.

According to yet another characteristic of the invention, the internal forces module may be capable of simulating deformations not only of geometrical type, but also of incision and/or removal of material and/or tearing type.

To allow the simulation of cutting (or incision) and/or of tearing (or fracture), the internal forces module is able, after determining the estimated displacements of the nodes, to delete at least one link between neighboring nodes as a function of a first criterion, then to update the node tensors and the link tensors as a function of the deleted link(s), and lastly to recalculate the internal forces of the nodes of at least the first part of the volume meshing.

Preferably, the first criterion pertains to at least one parameter chosen from among at least one cue transmitted by the user interface and relating to the type of tool maneuvered, a volume variation of the volume mesh cell comprising the link to be deleted, and a length variation of a link of the volume mesh cell comprising the link to be deleted.

Here, the term cue is understood to mean for example an item of data specifying that the tool is maneuvered with a view to an incision or a destruction of material.

Likewise, to allow the simulation of the removal of material, the internal forces module is able, after determining the estimated displacements of the nodes, to delete a node in the event of detecting the deletion of all the links which join the said node to the neighboring nodes or as a function of the first criterion, then to update the node tensors and the link tensors as a function of the node and of the deleted links, and lastly to recalculate the internal forces of the nodes of at least the first part of the volume meshing.

The tools (here virtual) capable of cutting (or of incising) and/or of removing material are for example scalpels, cutting forceps, or else mechanical or electrical bistoury, or alternatively lasers.

Moreover, the internal forces module is preferably devised so as, in the event of the deletion of a link and/or of a node and before updating the link tensors and node tensors, to add new mutually independent nodes and new links in such a way as to locally remesh the volume meshing subsequent to the deletion.

When the device is devised so as to work according to the aforesaid hybrid model, its internal forces module is capable of determining the internal forces exerted on the nodes of at least a second part of the volume meshing on the basis of boundary conditions defined by so-called connection nodes placed at the interface between the first and second parts, and of a table of deformation tensors, each tensor of which is representative of the influence of an elementary displacement of each node of at least the second part on each other node of at least this second part.

The boundary conditions serving in the calculation of the internal forces of the second part are preferably defined by the internal forces calculated for the connection nodes when calculating the internal forces of the nodes of the first part.

In the hybrid model, the internal forces module preferably proceeds by successive iterations until a position of so-called <<equilibrium>> of the internal forces of the connection nodes is obtained. To do this, this module is devised so as to deduce from the values of the internal forces exerted on the nodes of the second part of the volume meshing, values of displacement of the connection nodes in such a way as to provide boundary conditions which in turn make it possible to calculate the internal forces of the nodes of the first part.

The subdivision of the volume meshing into parts (at least two) is determined on the basis of a predetermined criterion pertaining at least to a parameter of the image data of the object chosen from among physical parameters and anatomical parameters, in particular to an intensity. This subdivision can be performed during the formation of the volume meshing of the 3D object. Accordingly, when the device does not comprise a meshing module, the subdivision can be performed by an external processing. The device can comprise a partitioning module, for example forming part of the meshing module if the latter exists, intended to provide the subdivision of the volume meshing.

Preferably, the <<collision>> determination module is devised so as to determine a collision between at least two tools managed by the user interface. This makes it possible to manage conflicts when one or more operators maneuver at least two tools at the same time.

For this purpose, each tool is represented by at least one point embodying its end interacting with the object, and a multiplicity of points joined to one another as well as to the end, by segments, embodying its <<shank>>.

Preferably, the collision determination module estimates the coordinates of the point of intersection between the <<tool>> and a surface mesh cell as follows:

Firstly, it creates a three-dimensional space encompassing the external envelope of the object, then it decomposes this space into volume blocks, the number of which is chosen so that each block comprises a number of node of the volume meshing of the object substantially equal to the number of nodes contained in the other volume blocks, each block intersecting the external surface comprising at least one node, and lastly it stores in multiplets the coordinates of each node with reference to the volume block which encompasses it. The presence of a point of the tool in the space is then effected, preferably, through a comparison between the multiplets and the coordinates of the point. One of these multiplets makes it possible to designate the volume block of the space in which the point lies.

Then, preferably, the collision detection module determines the (Euclidean) distance which separates the point of the tool from the node(s) encompassed in the designated volume block so as to determine the smallest of these distances, termed the minimum distance. Thereafter it determines the distance (for example Euclidean) which separates the point from the node(s) encompassed in a predetermined number of volume blocks neighboring the volume block in which it lies so as to compare its distances with the minimum distance. Then, it determines the collection of surface mesh cells adjacent to the node associated with the minimum distance so as to determine whether a segment defined by the position of the point of the tool and by its previous position intersects one at least of these adjacent surface mesh cells. Lastly, from this it deduces the (barycentric) coordinates of the point of intersection (or of collision) between the object and the tool, with a view to their transmission to the internal forces module.

Preferably, the collision detection module is capable of modifying the contents of the multiplets between two determinations of presence of points of the tool inside the volume blocks, in the event of detection of a deformation of the mesh by the internal forces module. This makes it possible to improve the accuracy of collision detection and hence of the calculation of the deformation.

In order to allow the most realistic possible simulation of action on one or more tools, the user interface comprises a harness maneuverable by at least one operator hand so as to simulate the maneuvering of each tool. The operator thus maneuvers the harness, which may be a <<joystick>> possibly fitted with actuator(s) or else an articulated <<glove>> fixed on his hand, then the user interface defines the displacement of the associated virtual tool on the basis of this maneuver.

According to yet another characteristic of the invention, the device comprises display means making it possible to display in real time (and continuously) the image (formed from the image data) of the object and of a representation of the tool.

The invention applies most particularly to the sets of image data representing a three-dimensional digital image of a region comprising at least one 3D object, including the designated object, and more particularly still to the sets of image data representing a three-dimensional digital image of a region of a living being (animal or human) comprising deformable anatomical structures such as the liver, the kidney, the gall bladder, or alternatively the heart.

The invention also proposes a process for processing the digital image data for implementing the device described above, comprising the following known steps:

provide a user interface capable of generating a force feedback, in accordance with the reactions of a tool, establish, on the basis of a deformation law and of an action defined by the user interface and representative of a maneuver of the tool, a field of internal forces between nodes of a volume meshing dependent on a surface meshing of a 3D object appearing in a set of image data, determine the reaction force of the object which corresponds to its deformation estimated on the basis of the internal forces, so that the force generated by the user interface is substantially balanced by this reaction force, calculate new image data of the object, in the presence of the estimated deformations supplemented with the representation of the said tool, and characterized in that there is provision for a step in which a point of intersection between a straight line embodying a displacement derived from the defined action and the surface meshing is estimated, and in that the internal force exerted on the nodes of a first part at least of the volume meshing of the object is estimated, on the basis of the displacement applied to the nodes belonging to the surface mesh cell containing the point of intersection, of boundary conditions, and of node tensors and link tensors emanating respectively for each node and each link of this part at least, from stiffness matrices specific to each volume mesh cell of at least the first part and dependent on the deformation law.

BRIEF DESCRIPTION OF THE DRAWINGS

Other characteristics and advantages of the invention will become apparent on examining the detailed description which follows, as well as the appended drawings in which:

FIG. 3 diagrammatically illustrates the mode of displacing a tool controlled by a type of user interface of the device according to the invention;

FIG. 4 illustrates the external envelope (or external surface) of a human liver, obtained on the basis of a segmentation technique;

FIG. 5 illustrates the external envelope of the liver of FIG. 4, furnished with a surface mesh of triangular type;

FIG. 6 is a diagram illustrating a tetrahedral volume mesh obtained from a triangular surface mesh of the type of that of FIG. 5;

The drawings are, in essence, of definite character. Accordingly, they form an integral part of the present description. They may therefore serve not only to provide a better understanding of the invention, but also contribute to the definition of the latter.

DESCRIPTION OF THE PREFERRED EMBODIMENTS

In what follows, reference will be made to a processing of a set of digital image data forming a medical three-dimensional (3D) image, and more particularly, but solely by way of example, to images of regions of the liver of the type of that illustrated partially in FIGS. 1 and 4, which have been obtained in a human subject.

It is however clear that the invention is not limited to the processing of medical images, and still less to that of images of the liver. It applies generally to the processing of digital images of three-dimensional (3D) objects, in particular deformable objects, with a view to simulation of their deformation by at least one virtual tool. The word deformation is understood here within its most general acceptance, namely both of the geometrical (surface or volume) type and also of the incision, or tearing, or alternatively removal of material type.

In the medical field, a set of image data forming a three-dimensional (3D) image is obtained with the aid of apparatus such as X-ray scanners or nuclear magnetic resonance apparatus (MRI), or more generally any type of apparatus capable of acquiring variable-intensity images. Each elementary part of a region represented by a 3D image is defined by three spatial coordinates and at least one measured physical quantity, such as for example an intensity.

In the case of MRI, the 3D image of an observed region consists of a multiplicity of stacked 2D sections, within which the intensity variations represent the proton density of the tissues.

Figure 1:
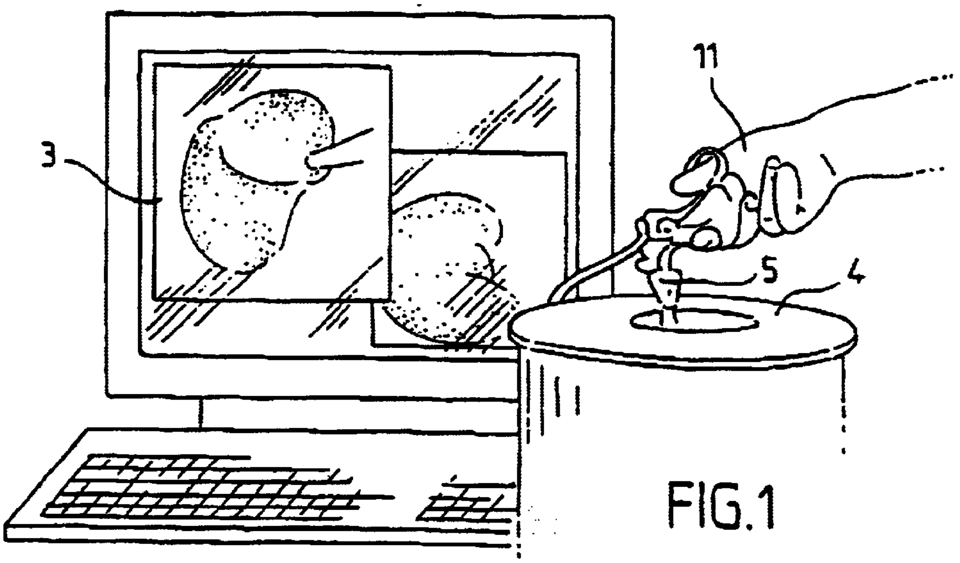
FIG. 1 is a perspective view of part of a simulation device according to the invention.

Illustrated partially in FIG. 1 is a device according to the invention, intended for simulating the dynamic behavior of a three-dimensional (3D) object. Here, as indicated earlier, the 3D object is a human liver.

In the example illustrated, the device comprises a control and calculating unit 1 coupled to a graphics station 2 comprising display means, such as for example a monitor 3, as well as to a user interface 4 having force feedback.

In this example, the control unit 1 and the graphics station 2 are two separate computers, but it is clear that they could form a single calculating unit.

In the embodiment illustrated, the control unit 1 is preferably a PC type microcomputer, whereas the graphics station 2 is preferably a DEC ALPHA 233 MHz type workstation equipped with a 3D graphics accelerator card. Here it is preferable to use the most powerful calculating unit to manage the displaying of images, owing to the need to calculate the deformation and to display in real time both the image of the liver and of the representation of a tool, or several tools, this requiring the refreshing of the images at a video type frequency of greater than 20 Hz.

Moreover, the link between the control unit 1 and the force feedback user interface 4 will preferably be an ISA bus, which permits data transfer rates of 10 kHz which are well above the frequency required for the force feedback, which generally lies between 300 and 500 Hz.

The effort feedback user interface 4 comprises a manual control 5 (or harness) of the <<joystick>> type capable of reproducing the behavior of a minimally invasive surgical tool. It could in particular be a tool for laparoscopic or coelioscopic surgery. In what follows, the joystick will be regarded as simulating the movement of microscopic cutting forceps intended to be introduced into the body of a patient via a fixed point termed a trocar with a view to an intervention on the liver. Of course, the invention is not limited to this type of surgery or tool alone.

The effort feedback user interface 4 could for example be the <<laparoscopic impulse engine>> (LIE) from the company Immersion Corporation, or else the PHANToM device developed by the Massachussets Institute of Technology. The <<laparoscopic impulse engine>> (LIE) possesses five degrees of freedom, three to represent the displacement of the tool shank in space, a fourth for the rotation of this shank about an axis passing through the trocar, and a fifth associated with the opening or closing of the forceps located at the end of the shank. The effort feedback can be applied to three of these degrees of freedom with the aid of motors. The forces are transmitted via a system of cables and capstans thus delivering a high and progressive torque.

Illustrated diagrammatically in FIG. 3 is the mode of displacing the shank 6 of the cutting forceps controlled by the LIE. The end 7 of the shank 6 is embodied here by a sphere which diagrammatically represents the active end (for example the cutting end) of the virtual tool. The trocar is embodied by a fixed point 8 through which the shank 6 of the tool passes, which shank is connected to two motors 9 and 10 which allow it displacements over a spherical cap whose radius varies according to the length of the shank 6, which is managed by a third motor (not represented). The position of the end 7 of the tool on the spherical cap is determined by the values of the angles $\alpha$ and $\beta$.

When, with the aid of his hand 11 (see FIG. 1), an operator maneuvers the grippable part of the joystick 5, he can move the axis 6 in such a way as to vary the length which separates the fixed point 8 (or trocar) from the cutting end 7 thus making it possible to simulate the approaching of the tool towards the 3D object, but he can also move this end 7 over a spherical cap whose radius depends on the trocar/end distance.

Of course, the user interface 4 can comprise two LIEs so as to allow the simulation of the simultaneous handling of two tools.

A purpose of the device according to the invention is, as has already been stated, to process, in real time, digital image data forming successive three-dimensional images of a 3D object (here a human liver), which are obtained, for example, by X-ray scanning, or by MRI, depending on the object or organ concerned.

It is firstly necessary for the device to possess the set of image data forming the image of the 3D object, the external envelope of this object, the surface mesh of this envelope, and the primary volume mesh of the object formed on the basis of the surface mesh. All these data may be obtained outside of the device according to the invention. They could in particular originate from an image data bank coupled to a meshing module. However, the device can comprise a meshing module capable of determining the external envelope and the surface and primary volume meshes on the basis of an image data set provided by an external means.

The external envelope 12 (see FIG. 4) could be obtained by any technique known to the person skilled in the art, and for example with the aid of a segmentation technique of the iso-surface extraction type, such as the so-called <<3D snakes>> or the <<marching cubes>> techniques which are well known to the person skilled in the art.

In the case of a meshing module built into the device, the latter will preferably be housed in the graphics station 2.

The general shape of the surface mesh cells 13 into which the external envelope is decomposed is preferably triangular (see FIG. 5). A criterion for optimizing the surface area of the surface mesh cells could be implemented so as to obtain a regular mesh. Of course, other types of surface meshes may be used, such as in particular the <<simplex>> meshes developed by H. Delingette and disclosed in INRIA technical report No. 2214 entitled <<Simplex meshes: a general representation for 3D shape reconstruction>>, 1994.

A volume mesh of the 3D object, here the liver, is determined from the surface mesh cells 13. It is clear that the general shape of the mesh cells depends on the shape of the surface mesh cells 13. In this example where the surface mesh cells 13 are triangular, the volume mesh cells (see FIG. 6) are advantageously tetrahedra 14 at the four vertices of which are located nodes 15 over which the object's mass, which is otherwise known, is distributed.

This decomposition of the volume encompassed by the external envelope 12 into mesh cells, here tetrahedra, can be obtained with the aid of a Delaunay-Voronoï type algorithm using, for example, the Simail module marketed by the French company SIMULOG S.A. Of course, other algorithms could be used with a view to obtaining the volume mesh.

As was indicated earlier, the device according to the invention does not necessarily comprise a meshing module intended for determining the external envelope of the 3D object and/or the decomposition into surface mesh cells and/or the decomposition into volume mesh cells. All or some of this processing of the image data set of the 3D object can be performed in a manner totally separate of the device according to the invention.

Knowing the set of image data of the 3D object, and its decomposition into volume mesh cells 14, here tetrahedral, the device will determine the so-called <<internal>> forces which are exerted on each node 15 of the volume mesh. It is clear that the sum of the internal forces exerted on a given node is different from zero only when this node is shifted from its equilibrium position. To do this, an external force must be applied to at least one of the nodes, for example by a tool.

Figure 14:
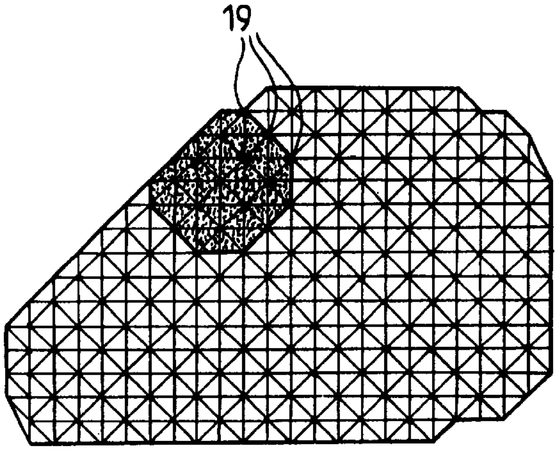
FIG. 14 is a diagram illustrating a decomposition of a triangular surface mesh into two domains (or parts), in a hybrid type processing.

The internal forces may be determined, either over the entire volume mesh with the aid of a first method using a single so-called <<masses/tensors>> technique which will be described below, or with the aid at least of a second method using the first masses/tensors technique as well as a second, different technique, each technique being applied to at least one domain arising from a decomposition of the volume mesh. This second so-called <<hybrid>> method will be described later, with reference to FIGS. 14 and 15.

Figure 2:
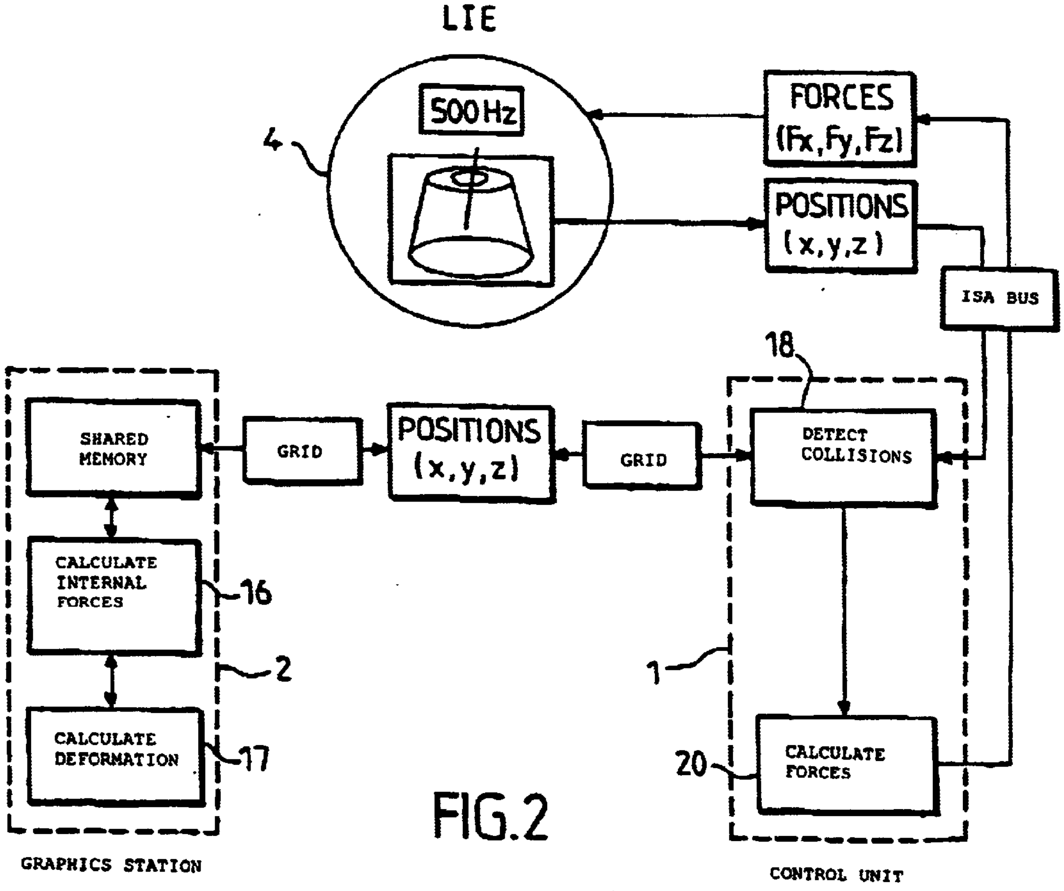
FIG. 2 is a functional diagram illustrating the architecture of a simulation device according to the invention in an embodiment with two processing modules.

Nevertheless, regardless of the method, the determination of the internal forces is performed by virtue of an internal forces module 16 (see FIG. 2) which is preferably built into the graphics station 2 (but it could be built into the control unit 1), and which requires the assistance of a collision detection module 18 built, preferably, into the control unit 1.

Figure 16:
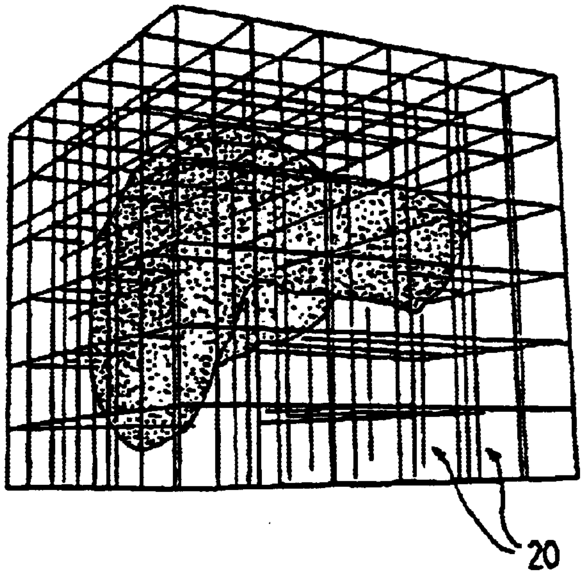
FIG. 16 is a diagram illustrating a space encompassing the liver of FIG. 4 and decomposed into parallelepipedal volume blocks.
Figure 17:
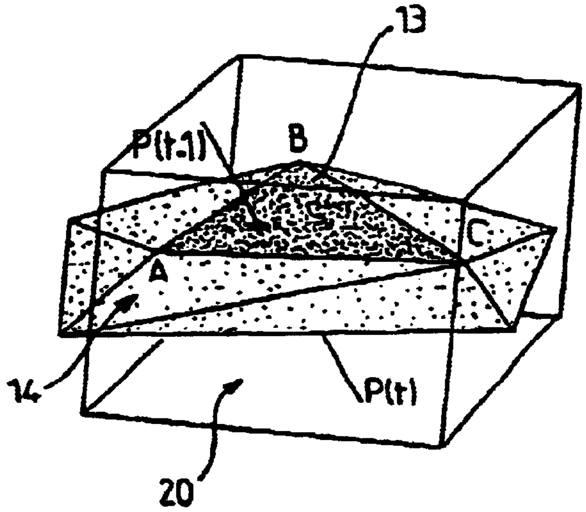
FIG. 17 is a diagram illustrating part of a tetrahedral volume mesh contained in a parallelepipedal volume block, as well as a point of collision between a tool and one of the triangular surface mesh cells of the part of the said volume mesh.
Figure 18:
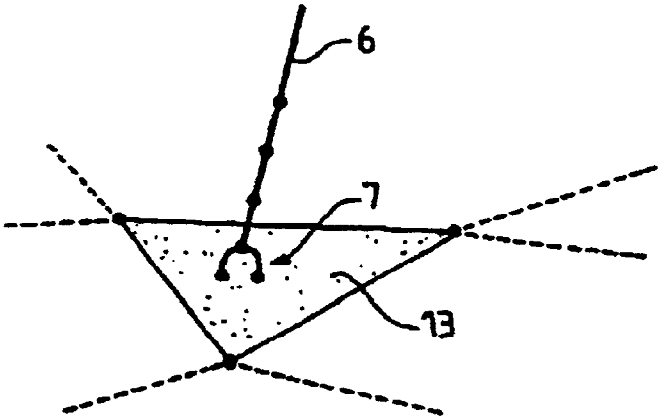
FIG. 18 is a diagram illustrating the embodying of a tool in the form of points and segments, with reference to a part of a triangular surface mesh.

The purpose of such a module is to accurately determine the locus of collision (or of intersection) between a point embodying a part of the tool and the external envelope of the 3D object, or more precisely a surface mesh cell of this envelope (see FIGS. 16 to 18). This makes it possible to provide the internal forces module 16 with the designation of at least one surface mesh cell node on which the tool acts, and which will make it possible to determine the internal forces exerted at each other node of the volume mesh cell.

The level of accuracy of the point of intersection (or of collision) can be managed on the basis of the number of points used to embody, on the one hand, the end 7 of the tool, and on the other hand, the latter's shank 6. In other words, the collision detection performed by the collision detection module 18 can be applied at one or more points embodying the tool. An example of discretizing the shape of the tool (shank and end) is given in FIG. 18, in which each point other than the points embodying the nodes of a surface mesh cell 13 are joined together by segments so as to reconstruct the shape of the tool and more particularly that of its shank and of its end, here cutting forceps. It is possible to apply the collision detection to the shank 6 of the tool so as to determine a collision between two shanks of simultaneously actuated tools.

The collision detection module 18 operates as described below. Initially, the tool is discretized into a certain number of points $p_k$, which depends both on the instrument used and on the accuracy desired. Next, a space is defined which encompasses the 3D object concerned. This space is then subdivided into volume blocks, for example, of parallelepipedal shapes. The number of volume blocks in each direction in space may be parametrizable, and is preferably chosen as a function of the geometry of the 3D object. Preferably, the parametrization is chosen so that the number of nodes of the volume mesh of the 3D object is substantially identical in all the volume blocks of the space defined by the collision detection module and containing the object. Likewise preferably, a constraint is imposed which consists in insisting that each volume block intersecting the external surface of the object encompass at least one node of the mesh.

On the basis of this decomposition of the space which encompasses the 3D object into volume blocks, a table is generated in which are stored multiplets comprising the coordinates of each node of the volume mesh with reference to the definition of the volume block which encompasses it. The determination of a point of collision at the level of a surface mesh cell 13 of the external envelope of the 3D object is performed with the aid of a comparison between the position of a moving point $p_k$ of the tool, which position is deduced from the information provided by the force feedback user interface 4, as well as on the basis of the multiplets stored in the table.

To do this, a code function is defined which makes it possible to calculate an entry inside the table and to find the list of nodes of the volume mesh which correspond to this entry, the said nodes then belonging to the same volume block as the moving point $p_k$. Such a code function is given by the formulae referenced (1) in the appendix, by way of example.

Then, for each node $N_i$ situated in the same volume block as the moving point $p_k$, the Euclidean distance between $p_k$ and each of the $N_i$ is determined. The smallest of the distances thus calculated is then denoted $d_{min}$. Next, the distance d, which separates the moving point $p_k$ from each node $N_j$ situated in a predetermined number of neighboring volume blocks, for example 26, is calculated. If one of these distances d, associated with a node N, is less than $d_{min}$, then $d_{min}$=d. It is clear that the larger the number of nodes inside a volume block, the longer the calculation time will be.

Next, the number of surface mesh cells 13 (here triangles) which are adjacent to the node N associated with the minimum distance $d_{min}$=d is determined. Then, for each surface mesh cell adjacent to N, a check is made as to whether it is intersected by the segment $[P_t, P_{t-1}]$ defined by the positions of the moving point $p_k$ at the instants t and t−1, as illustrated in FIG. 17. Thus, regardless of the rate of displacement of the tool, it will always be possible to determine the point of intersection (or of collision), given that only the length of the segment $[P_t, P_{t-1}]$ varies as a function of the rate.

The position of the point of collision is sub-triangular. Consequently, the coordinates of this point of collision are determined by a barycentric method. These barycentric coordinates are then transmitted to the internal forces module 16 so that the force exerted by the tool on the volume mesh is estimated accurately.

Knowing the surface mesh cell intersected, the internal forces module 16 deduces therefrom the nodes on which the action of the tool is exerted. Then, from the barycentric coordinates, it deduces the distribution of the displacement of the virtual tool over each of the nodes of the designated surface mesh cell. At the same time, the user interface 4 provides the internal forces module 16 with the information relating to the vector displacement of the tool, either directly via a bus, or via the control unit 1.

The device according to the invention uses a technique referred to as <<masses/tensors>> in which the nodes belonging to the surface mesh cell, the locus of the collision with the tool, are subjected to the vector displacement provided (distributed according to the barycentric coordinates of the said nodes), then the internal forces applied at each node of the volume mesh are estimated. This estimation is preferably iterative, each iteration making it possible to calculate the internal forces applied at a first <<level>> of nodes, and those of a next <<level>> made up of the nodes neighboring the nodes of this first <<level>>, and so on and so forth until all the nodes have been processed. This constitutes a kind of node-to-node <<constraint propagation>> mechanism. In fact, during the first iteration, only the internal forces of a first node level are non-zero, those of the other nodes being zero. It is in the course of the succeeding iterations that progressively (<<level>> after <<level>>) the (non-zero) internal forces of the other nodes of the mesh are obtained.

This technique makes it possible to estimate the internal forces independently of the direction of the links. Thus, the deformation induced by the virtual tool on the 3D object is independent of its volume mesh. Such a characteristic of independence relative to the initial mesh is particularly beneficial in the field of simulation, especially of surgical intervention, where the deformations induced by a tool are generally volumic as in the case of an incision, or of a tear, or alternatively of a removal of material.

In an approach where the deformation law is of volume linear elastic type, the internal force exerted on a node $N_i$ subjected to a displacement u is given by the formula referenced (2) in the appendix.

This formula (2) can be decomposed into two parts, or two forces, one associated with the actual displacement of the node (or mass) $N_i$, with respect to its equilibrium position, the other associated with the displacement of a neighboring node $N_3$. Let ν be the collection of nodes $N_j$ neighboring node $N_i$, formula 2 for the internal forces applied to node $N_i$ can then be rewritten as indicated in the formula (3) given in the appendix.

In this formula (3), the expressions between square brackets, $[T_{ii}]$ and $[T_{ij}]$, represent matrices of dimension 3×3 which will subsequently be referred to respectively as node tensors and link tensors, on account of their being defined similarly to force tensors which are well known to the person skilled in the art.

To determine these node and link tensors, it is necessary, firstly, to evaluate the elementary stiffness matrix $[K^e]$ associated with each volume mesh cell (here a tetrahedron) adjacent to each link arising from node $N_i$.

Figure 7:
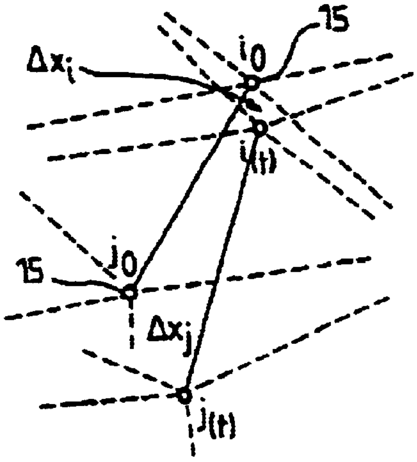
FIG. 7 is a diagram illustrating the displacements at an instant t of two nodes with respect to their respective positions of equilibrium and of the positions of equilibrium of their neighboring nodes.

As is represented in FIG. 7, the vector displacement of a node $N_i$ between an instant indexed 0 and the instant t may be denoted $\Delta x_i$. This displacement comprises three components along the three directions in space.

A stiffness matrix represents, in respect of a 3D object, in particular a deformable one, the various relations that exist between its constituent elements. In other words, it conveys the influence of a node on other nodes, this being given by the deformation law. The numerical values of the components of a stiffness matrix consequently depend on the elasticity parameters of the object, which are known. The deformation law can be stored in the internal forces module 16 of the graphics station 2.

If T denotes a tetrahedral volume mesh cell, then the elementary stiffness matrix of this tetrahedron is given by the formula (4) given in the appendix, by way of example.

Figure 8:
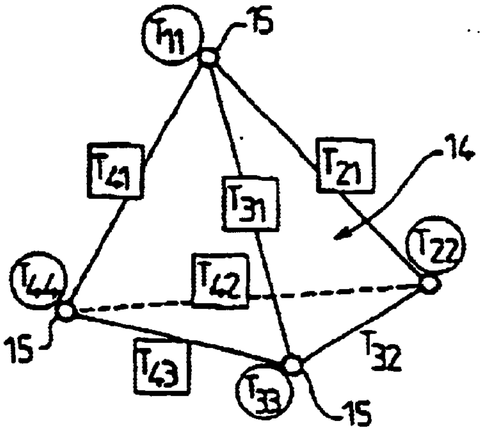
FIG. 8 is a diagram illustrating a tetrahedral volume mesh cell and the designation of the node tensors and of the link tensors respectively associated with its nodes and links.

Once the stiffness matrix $[K^e]$ of each tetrahedron T has been calculated, a node tensor $T_{ij}$ or a link tensor $T_{ij}$ is associated with each tetrahedron vertex (or each node), as well as with each of its links, as illustrated in FIG. 8. This association is performed on the basis of implicit formulae given in the appendix under the reference (5).

Figure 9:
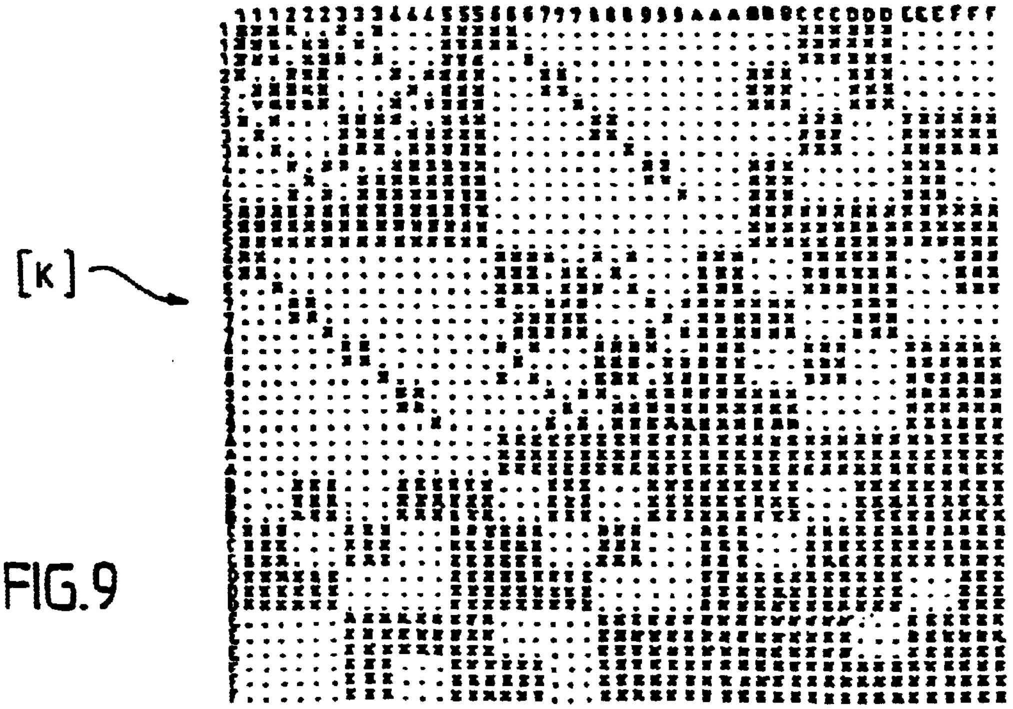
FIG. 9 is an example of a stiffness matrix of a 3D object represented by 15 nodes, the crosses (X) signifying non-zero values and the dots (.) zero values.

The overall stiffness matrix [K] of the 3D object can be determined from the set of elementary stiffness matrices $[K^e]$. Such an overall matrix is illustrated, by way of example, in FIG. 9, in the case of a 3D object represented by 15 nodes referenced from 1 to F. Here, the crosses represent non-zero values, whilst the dots represent zero values.

In order to simplify the calculations of the internal forces, it is possible to limit the number of links in the volume mesh cell by filtering the values of the components of the elementary stiffness matrices $[K^e]$, for example by comparing them with a threshold. Thus, any value below this threshold is regarded as zero, this amounting to deleting links between two nodes. This technique for simplifying the matrices makes it possible to determine only the links which are vital to the transmission of the constraints (displacement constraints) through the volume mesh.

Moreover, it is also possible to simplify the calculation of the link tensors by taking into account the symmetry property of the overall stiffness matrix [K]. Thus, a single, unique link tensor is sufficient to characterize each link. In other words, let $l_{ij}$ be the link defined between nodes $N_i$ and $N_j$, the link tensor associated with this link will be $[T_{ij}]$ if i>j and $[T_{ij}]^t$ if i<j. The exponent t denotes the transpose of the matrix concerned.

Having reached this juncture, the following are available: firstly, the coordinates of each node $N_i$, secondly, the external envelope, the surface mesh of this external envelope and the final volume mesh of the entire 3D object, thirdly the links $l_{ij}$ between two nodes Ni and Nj of the set of tetrahedra T making up the volume mesh of the 3D object, and fourthly, the set of node tensors $[T_{ii}]$ and link tensors $[T_{ij}]$ associated with each node and each link of each tetrahedron T.

Figure 10:
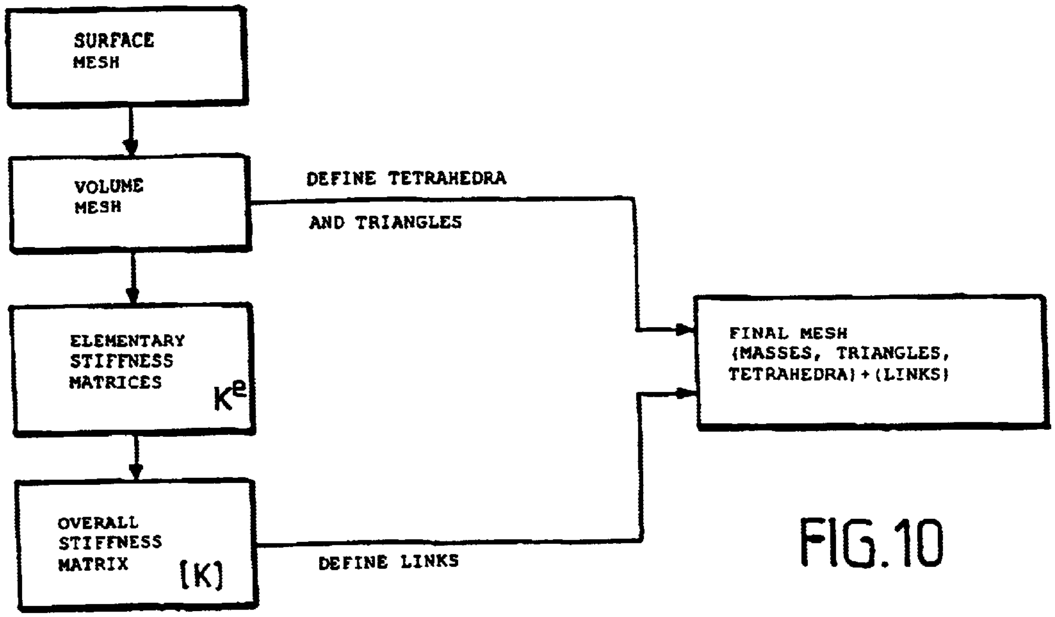
FIG. 10 is a mechanism illustrating the steps for determining a final mesh of a 3D object at equilibrium.

A data structure (or base) will then preferably be defined, making it possible to ascertain, firstly, the index of the two nodes situated at the ends of each link, secondly, the reference of a tetrahedron (volume mesh cell) adjacent to a triangle (surface mesh cell), thirdly, the state of a tetrahedron (active or inactive), and fourthly, the state of a link (active or inactive). This information could be useful for taking into account deformations of the incision, tear or removal of material type, both at graphical and physical level. The various steps for obtaining all these parameters are summarized in FIG. 10.

In order to take into account auxiliary surface forces, making it possible for example to amplify an effect felt during an incision or when cutting, the internal forces module 16 of the device according to the invention can combine the surface and volume link forces described earlier with tensile forces $F_i^{tension}$ of the type of those given in formula (6) in the appendix. These forces may be chosen by varying $l_0$ the unloaded length of the associated spring, as well as its stiffness, depending on the magnitude of the amplification desired. This magnitude may be defined, for example, by the operator, or else by the user interface 4 depending on the type of tool and/or the type of object on which the intervention takes place.

When such a consideration is taken into account, the formula (3) for the internal force exerted on a node $N_i$ turns into the formula (7), given in the appendix.

Moreover, it is also possible to take account in the calculation of the internal forces exerted on each node of the volume mesh, of one or more types of exterior forces due to the presence of other objects in the neighborhood of the 3D object concerned, as well as to the gravitational forces which cause a 3D object to tend to sag under its own weight owing to gravity. Such exterior forces may for example be the weight exerted at a part of the 3D object by a neighboring object, or else the force of attachment exerted by a tie, such as for example a ligament, between the 3D object and a neighboring object.

It is clear that a force of the attachment type may be regarded as a boundary condition akin, for example, to a restoring force in a damped spring possessing a fixed end, the other end being joined to a node of a surface mesh cell of the 3D object.

The determination of the deformation of a 3D object, or more precisely of its volume mesh, requires the knowledge at each instant of the displacements of each node of this volume mesh. This real-time determination relies on a principle of dynamic animation which relates the sum of the forces applied to the deformable 3D object to its acceleration. Here, the deformable 3D object is formed by a collection of point masses (or nodes $N_i$) joined together by link forces. It is consequently possible to apply the general equation of mechanics to a volume mesh in such a way as to simulate the dynamic behavior of the 3D object which it represents when the latter is deformed by exterior forces generated by a tool whose displacement is defined by the force feedback user interface 4, in reaction to a maneuvering of the joystick 5 by an operator.

At a given instant t, the force applied to a node $N_i$ of mass $m_i$ is therefore given by the general equation of dynamics given in formula (8) in the appendix.

In what follows, it will be assumed that all the nodes of the volume mesh possess the same mass ($m_i=\mu$). Of course, it would be possible to proceed differently, each node possessing its own mass, which can be determined by knowing the makeup of the region which it represents. This makeup information may form part of the set of image data forming the 3D digital image of the object. However, it may also be provided separately.

It is therefore possible to determine the acceleration $a_i$ of each mass or node $N_i$, and consequently to retrieve firstly its velocity $v_i$, then secondly its position $x_{i+1}$ at an instant t+Δt by performing integrations, for example numerical integrations. It is this calculation of all the positions $x_{i+1}$ at the instant t+Δt which will provide the displacements of each node and consequently the deformation of the volume mesh cell. To do this, the following types of method could be used: Euler, or Runge-Kutta of order 2, or more preferably of order 4.

The Euler method is the one most commonly employed. It consists, for example, in starting from a differential equation dx/dt=f(x,t), with initial condition $x=x_0$ at the instant t=0. A time step At is then chosen, such that $T_i=i\Delta t$, with i=0,1,2 . . . . Knowing the position of a node $x_i$ at the instant ti, it is then possible to deduce the position of this same node at the instant $t_{i+1}=t+\Delta t$ (see formula (9) in the appendix).

Two additions, two multiplications and an evaluation of the forces are then necessary to obtain the position of a node N together with its velocity at an instant t+Δt, from its acceleration at the instant t. The velocity and the position of the node are given by way of example in the formulae (10) in the appendix.

The Runge-Kutta formula of order 4 is currently preferred on account in particular of its numerical accuracy. It relies, for example, on the formulae (11) given in the appendix.

In this method, the external and internal forces at each node must be evaluated four times.

Of course, other integration techniques, in particular numerical ones, may be used.

Figure 11:
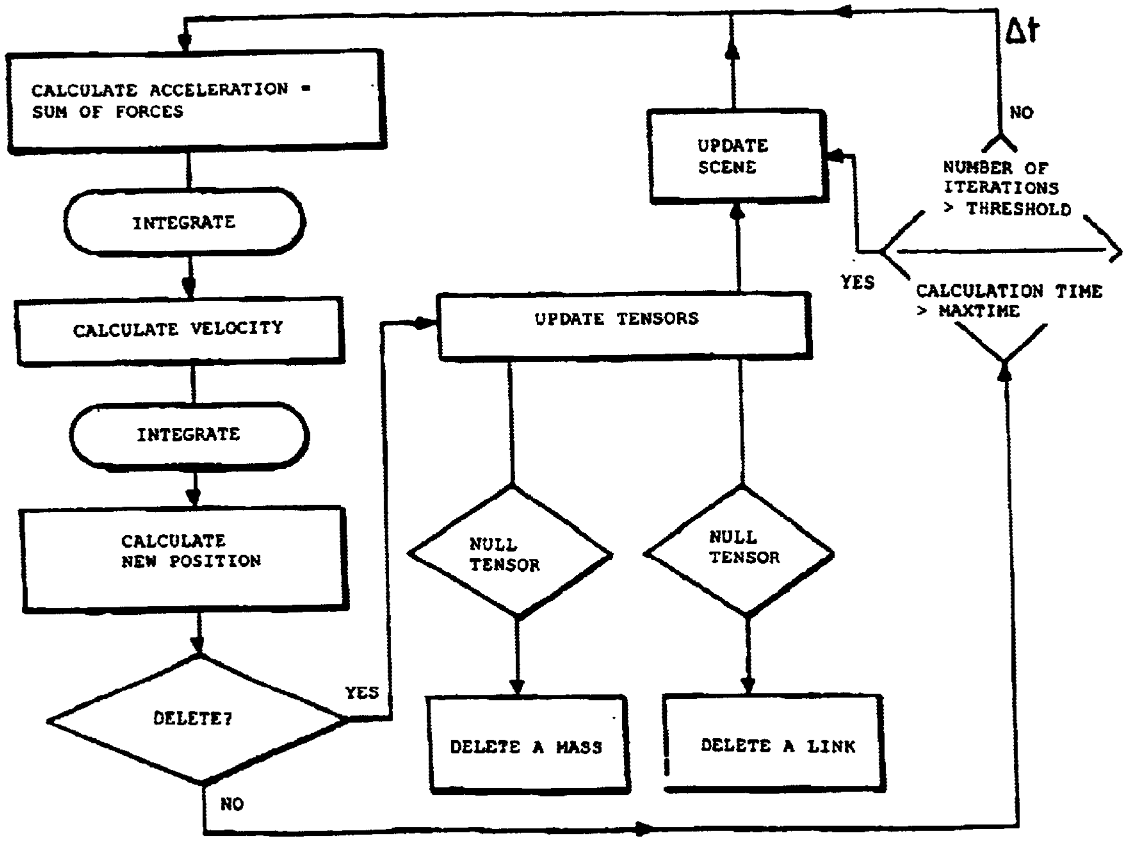
FIG. 11 is a mechanism illustrating the steps for determining a deformation and the image of the deformed object.

In the left part of FIG. 11 is represented the sequencing of the steps which make it possible to determine the displacement of each node of the volume mesh cell, or of the selected part thereof, from the vector displacement of the end 7 of the shank 6 of the virtual tool relative to the 3D object, due to the action of the operator on the joystick 5. This vector displacement is provided by the force feedback user interface 4, via the ISA bus, preferably at the same time as the position of the end 7.

As soon as the collision detection module 18 has determined a point of intersection between the <<tool>> and the surface mesh, the internal forces module 16 can begin determining the internal forces exerted on the nodes of the first part of the volume mesh.

To do this, it applies a vector displacement, equal to that provided by the user interface 4 which defines the displacement of the tool, to each node $N_c$ of the collision surface mesh cell detected (here there are three owing to the triangular shape of the mesh cell). Next, it determines the internal force exerted on each node of the first part of the mesh by using formulae (3) or (7) depending on the external forces chosen by the operator and/or the user interface 4. This determination calls upon the node tensors and link tensors, $[T_{ii}]$ and $[T_{ij}]$, previously determined and stored. In fact, during the first iteration, although the internal forces applied at each node are calculated, only those of the nodes neighboring the <<collision>> nodes $N_c$ are non-zero, given that the displacements of the other nodes are zero at this juncture in the calculation. From this is deduced the acceleration, the velocity and the displacement of the first-neighbor nodes, and consequently their new positions.

These new positions of the displaced nodes are then frozen for the remainder of the calculation, and the internal forces module 16 repeats its calculation so as to determine at each node of the first part (here the whole mesh cell), the internal force (non-zero) which is applied to it, and consequently its displacement. The internal forces are therefore calculated according to a model of the <<propagation of constraints>> type. The deformation induced by the vector displacement of the virtual <<tool>> on the volume mesh cell representing the 3D object is then known.

Between two loops for calculating the internal forces and the displacements due to a vector displacement of the <<tool>>, that is to say while propagating constraints, it is particularly advantageous to take into account information transmitted by the user interface 4, or defined by the operator, pertaining to the type of tool maneuvered and consequently the type of intervention performed. Indeed, such information may indicate to the internal forces module 16 that the action of the tool is intended to cut, or incise, or eliminate material. Thus, after an iteration during which internal forces (non-zero) exerted on certain nodes have been determined, the internal forces module 16 can delete the links which are in the cutting plane of a tool for incising or removing material (embodied by volume mesh cells, here tetrahedra) which lies in the zone of interaction of the virtual <<tool>>, on the basis of the action information with which it is provided by the collision detection module 18 and the user interface 4.

In this case, a certain number of links and/or of nodes are deleted. The internal forces module must then update the node tensors and the link tensors as a function of the deleted link(s) and/or node(s). This taking into account of the aforesaid information serves as a deletion criterion.

Virtual tools capable of cutting (or of incising) and/or of removing material are for example scalpels, cutting forceps, or else mechanical or electrical bistoury, or alternatively lasers.

Moreover, it is also particularly advantageous for the deletion criterion to be capable, between two calculation loops, of performing a test pertaining to the integrity of the links between nodes whose displacements have just been determined and are henceforth frozen.

The purpose of this test is to determine whether certain displacements are such that in reality they would have caused the rupture of one or more links and/or the deletion of one or more nodes and hence of one or more tetrahedra (or volume mesh cells). The test consists in comparing the displacements with a predetermined link rupture threshold. This test could pertain, for example, to the volume variation of the volume mesh cell comprising the mesh cell to be deleted, and/or the length variation of the links of the volume mesh cell comprising the link to be deleted.

If no link is to be deleted, the internal forces module 16 goes to the next iteration (next loop) so as to continue the calculation of the internal forces (continue the propagation of constraints).

On the other hand, if the test indicates that at least one link is to be destroyed, that is to say if the intensity of the displacement exceeds the predetermined threshold, then the internal forces module 16 updates the node tensors $[T_{ii}]$ and the link tensors $[T_{ij}]$ of the volume mesh cell or of the first part of the latter, by taking account of the calculated displacements. The value of certain node tensors, and link tensors, may then become zero. This is the case in particular when the four links which join a node to the other four nodes of a given tetrahedron break. In this case, a node of the volume mesh cell, or several if necessary, must be deleted together with all the associated links.

Figure 12:
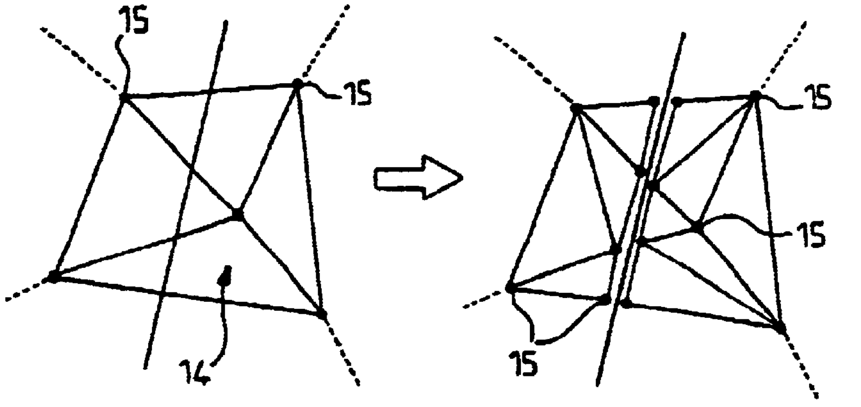
FIG. 12 is a diagram illustrating the modification of the topology of a tetrahedral volume mesh following the rupturing of a link.

The operation does not stop at this juncture, given that, for reasons concerned with the equilibrium of the deformed volume mesh cell, the latter must retain its general starting structure at the level of its surface and volume meshes. Now, the removal of a node, or the rupturing of a link give rise to modifications to one or more mesh cells, these no longer being, in the example illustrated, tetrahedral or triangular depending on whether a volume mesh cell or a surface mesh cell is being spoken of. Such a case is illustrated in FIG. 12 in which the action of the end 7 of the tool has given rise to the rupturing of four links in a particular sectional plane. Each of the four links being divided into two, it is then necessary to add nodes, and consequently links, so as to reconstruct tetrahedral mesh cells in the incised zone. In other words, the volume mesh must be locally remeshed.

Given that the result of adding nodes is an increase in the total mass of the 3D object, it is then necessary to modify the mass of all the other nodes of the volume mesh, and this may be done by a homogeneous distribution.

Moreover, adding nodes entails adding links so that the mesh cells retain their general shape, here triangular or tetrahedral. Consequently, the internal forces module 16 must create and/or destroy elementary stiffness matrices $[K^e]$ and node and link tensors, and recalculate the elementary stiffness matrices and the node tensors and the link tensors previously calculated, so that the calculations of the internal forces exerted on the nodes can be continued while taking account of these modifications.

It is clear that it is particularly advantageous for the collision module 18 to be able to update its multiplets alongside the alterations (deformation) in the part of the volume mesh cell.

As soon as the calculation of the internal forces and displacements is regarded by the internal forces module as having terminated for the value provided of the vector displacement of the tool, the refresh module 17 proceeds to the determination of the new image data of the object and of the embodying of the tool with a view to their display, whilst at the same time, the internal forces module recommences a new calculation with a new vector displacement of the tool, possibly applied to nodes other than those to which they were initially applied.

Substantially simultaneously with the determination of the new image data of the object and of the <<tool>>, a reaction module 20, preferably built into the control unit 1, determines the reaction force of the object, which corresponds to its deformation (displacements of the nodes) estimated on the basis of the internal forces. For each node displaced by the tool, its initial position (at t=0) and its current position (at the instant t) are known. Moreover, the tensors associated with this node and the links which are associated with it are known, thus making it possible to apply formula (3) given in the appendix.

The reaction force is then transmitted to the force feedback user interface (LIE) so that it generates on the joystick [lacuna] force (or force feedback) which is substantially balanced by the said reaction force. This makes it possible to transmit physical reactions of the object to the operator, this being essential for good control of the intervention maneuver.

As emerges from the above description, the masses/tensors calculation technique makes it possible to simulate all types of deformations, be they of geometrical type, of incision or cutting type, of tearing or fracturing type, or else of removal of material type.

Figure 13:
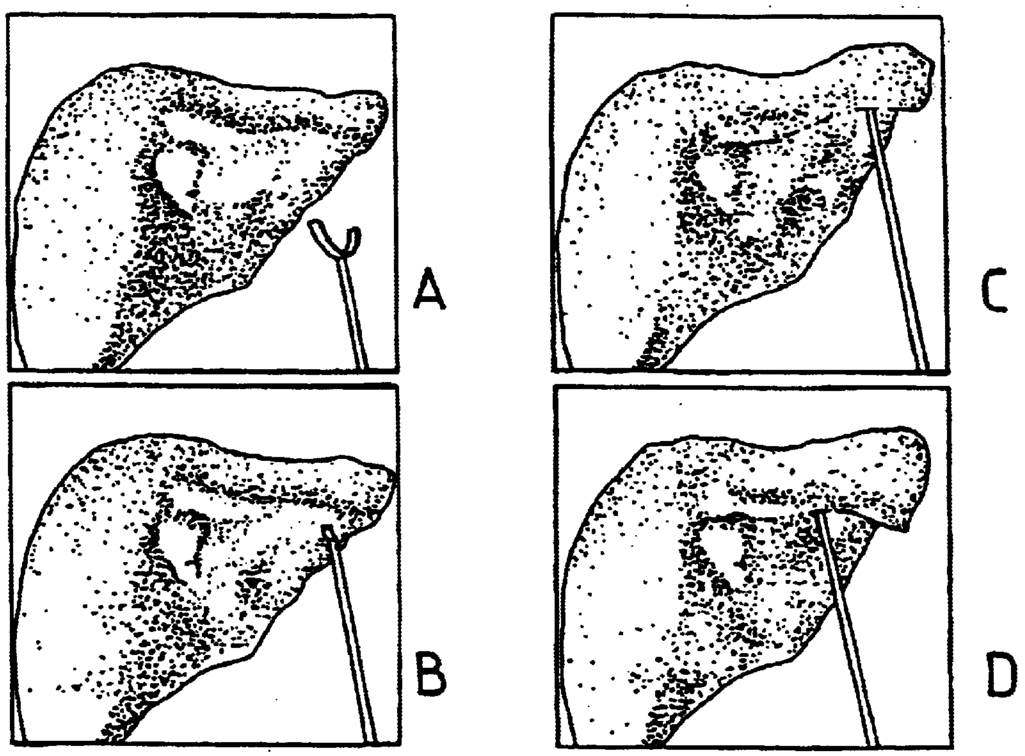
FIGS. 13A to 13D illustrate a simulation over four successive images of the action of the end of a virtual tool on a liver lobe.

Represented in FIG. 13 are four images of a human liver subjected to the action of a virtual tool of the cutting forceps type. Here, the action is a simple compression.

In order to improve the quality of the image, it is possible to envisage, before each update of the scene displayed, repeating the complete calculation of the deformation of the volume mesh cell a number of times, and consequently the tests pertaining to the node and link deletions, as well as those pertaining to the values of the components of the tensors. Thus, as long as the number of iterations is below a chosen threshold, and as long as the calculation time remains below the time required for the refreshing of the images on the display means, then the loop can be recommenced. On the other hand, if this is not the case, the updating of the scene displayed is carried out.

All the main steps of the masses/tensors technique are illustrated in the chart of FIG. 11.

The invention also proposes an electronic process for processing image data for implementing the aforesaid device, in which the following main steps are provided:

firstly, provide a user interface (4) capable of giving a force feedback, in accordance with the reactions of a tool, then, estimate a point of intersection (or of collision) between a straight line embodying a displacement derived from the action defined by the user interface and the surface mesh, then, establish a field of internal forces between nodes of a first part at least of a volume mesh dependent on a surface mesh of a 3D object appearing in a set of image data, on the basis of a deformation law, for example of volume linear elastic type, of a displacement, induced by an action defined by the user interface and representative of a maneuvering of the tool, applied to the nodes belonging to the surface mesh cell containing the point of intersection, of boundary conditions, and of node tensors and link tensors emanating respectively for each node and each link of this first part at least, from stiffness matrices specific to each volume mesh cell of at least the first part and dependent on the deformation law, next, determine the reaction force of the object which corresponds to its deformation estimated on the basis of the internal forces, so that the force generated by the user interface is substantially balanced by this reaction force, and lastly, calculate new image data of the object, in the presence of the estimated deformations supplemented with the representation of the tool.

In certain complex cases, where the number of image data forming the three-dimensional digital image of a 3D object is very large, the time required for calculating the internal forces and the deformation of the entire volume mesh may become greater than the time for refreshing the images on the display means (here a monitor). It follows that the application of the technique described above cannot be effected on the entire 3D object. This is why the device according to the invention may apply a second so-called hybrid method to the image data, in which the masses/tensors technique will be applied only to a first part of the volume mesh, whilst the complementary part, termed the second part, of this volume mesh will be processed with the aid of a second real-time calculation technique relying for example on a finite element type approach calling upon stored precalculations. This second technique is described in particular in the already cited article by S. Cotin, H. Delingette, M. Bro-Nielsen and N. Ayache, <<Geometric and physical representations for a simulator of hepatic surgery>>, published in the proceedings of the conference Medecine meets with virtual reality of January 1996.

In what follows, that part of the volume mesh to which the masses/tensors technique is applied will be called the first part, and that part which is complementary to the first part, to which the finite element technique is applied via stored precalculations, will be called the second part.

In the hybrid model, the volume mesh (initial or final) is subdivided into at least two domains. It is clear that it would be possible to envisage a subdivision into three domains, or even more, by virtue of a processing, for example in parallel, of the various domains. This subdivision into domains may be performed by the device according to the invention, when it comprises a special-purpose meshing module of the type of that described earlier, but it may also be performed outside the device in the converse case.

Whether it is done by an external module or by a module internal to the device, the subdivision into domains results from a selection by an operator or from an automatic detection resulting from a predetermined criterion applied to the image data of the 3D object. The criterion could in particular be a comparison of intensity between the various image data or else between these image data and a threshold, for example in the case of a tumor, or a detection of a physical or anatomical parameter contained in the said image data of the 3D object, and designating complex zones in which there are substructures such as for example tumors.

It is possible to envisage the mesh being subdivided into a multiplicity of regions, for example six or seven, and for that in which the collision with the <<tool>> is detected to be automatically designated as the first part, the complementary part then forming the second part of the volume mesh.

The device could comprise a specific partitioning module, different from the meshing module, for determining the subdivision into domains. This module will preferably be built into the internal forces module 16.

In the hybrid model, once the subdivision into parts has been performed, the internal forces module 16 begins the calculation of the internal forces of the entire volume mesh of the 3D object. This calculation can begin either with the first part of the mesh, with the aid of the masses/tensors technique, or with the second part of the mesh, with the aid of the finite element technique via precalculations (the so-called <<precalculations>> technique) which relies on two principles termed superposition and linearity.

The vector displacement of the tool induces a vector displacement of certain nodes of the volume mesh, which is regarded as a multiple of an elementary vector displacement. Then, the total displacement of each other node i (those on which the action of the tool is not exerted directly) is determined by summing (superposition principle) the contributions from the displacements of all the nodes j having undergone a displacement.

In order to implement this principle of superposition, it is necessary to determine a pre-calculation table for n×n deformation tensors, where n represents the total number of nodes of the mesh, or of a part thereof (for example only the nodes of the surface). To do this, an elementary displacement is applied at a given node, then the deformation which this displacement induces on all the other nodes of the mesh is calculated. From this are deduced n first elementary deformation tensors, one for each node. Then the two aforesaid operations are recommenced, applying the elementary displacement to another node of the mesh, this providing n second deformation tensors. These two operations are repeated for the n nodes of the mesh, until the n×n deformation tensors are obtained and which are stored in the form of a so-called pre calculation table.

A source of information is then available which makes it possible instantaneously to ascertain the deformation induced on the mesh cell by an elementary displacement of a given node. It is then merely necessary to determine the ratio of the vector displacement of the node to the elementary displacement, then to multiply the displacement of the nodes of the mesh stored in the table by this ratio (linearity principle). Stated otherwise, the total displacement of a node $N_i$ is obtained by summing the contributions from all the deformation tensors $T_{ij}$ denoted by the index i in the table ($T_{i0}, T'_{i1}, T'_{i2}, \ldots, T'_{in}$) without neglecting to multiply these contributions by the ratio.

More detailed descriptive elements of the second so-called precalculations technique are indicated, in particular, in the publication by S. Cotin, H. Delingette and N. Ayache, <<Real-time non linear elastic deformations of soft tissues for surgery simulation>>, INRIA research report, which will be made public after the present Patent Application has been filed.

Of course, as in the masses/tensors technique, the second technique takes account of the boundary conditions, and other auxiliary and/or external forces.

Regardless of which part of the mesh the calculation of the internal forces begins with, it is necessary to take account of the <<connection>> nodes 19 (see FIG. 14) which are located at the interface between the two parts, and which consequently belong to both these parts at the same time. According to the invention, the connection nodes define boundary conditions and consequently they are parameters of the deformation of the complete mesh.

If we argue on the basis of beginning the determination of the internal forces on the first part (with the aid of the masses/tensors technique), but it would be possible to do the opposite, we determine the internal forces, and consequently the displacements, of all the nodes of the first part of the mesh, including those of the connection nodes. The displacements of these nodes will then make it possible to determine, with the aid of the table of n×n precalculated and stored deformation tensors $T_{ij}$, according to the second technique described above, the displacements of all the nodes of the second part of the mesh. This provides new boundary conditions (external forces) for the first part of the mesh, and these will be taken into account for recalculating the internal forces applied at each node of the first part, and consequently the displacements of its nodes, including those of the connection nodes, this providing new boundary conditions for the second part of the mesh which will in turn make it possible to recalculate the displacements of the nodes of the second part.

Figure 15:
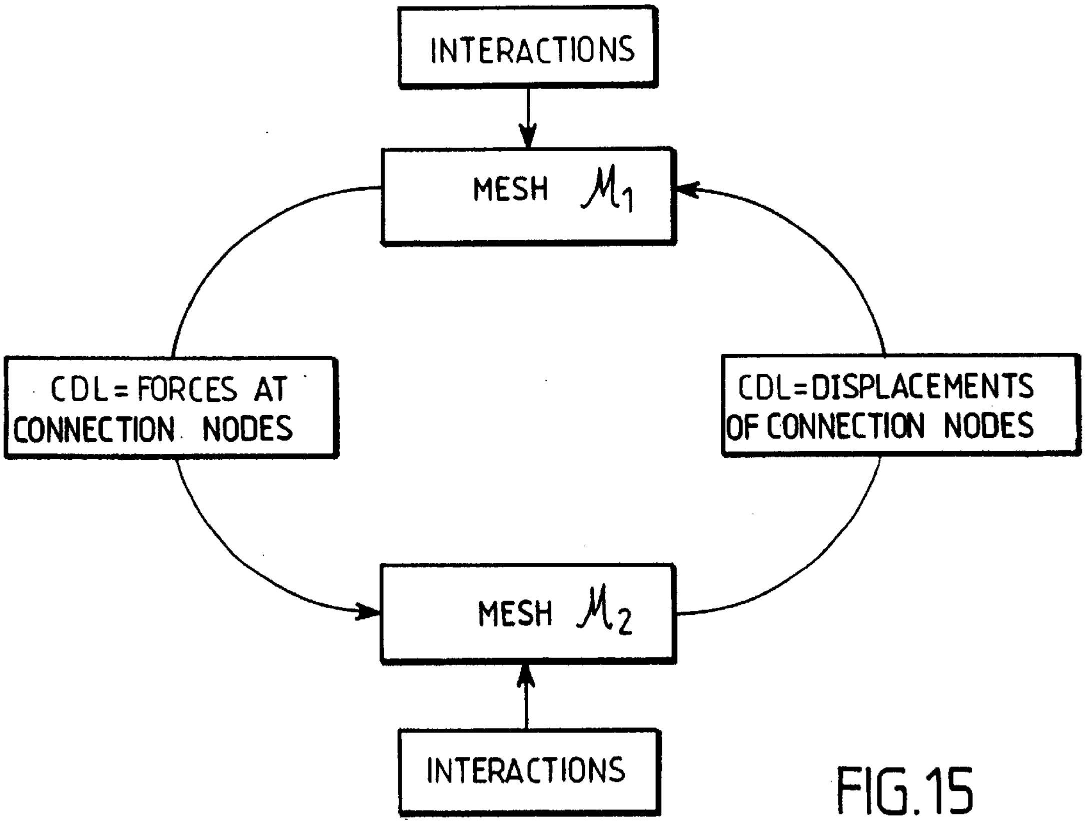
FIG. 15 is a mechanism illustrating a loop for determining positions of equilibrium in a hybrid mesh.

This procedure is repeated, preferably, until equilibrium is obtained between the two parts of the mesh, as regards the forces exerted on the connection nodes. This equilibrium can be fixed by a convergence threshold, or else by a <<floating>> number of iterations depending on the calculation time permitted, which must necessarily be less than the time required for the refreshing of an image (frequency greater than 20 Hz). The animation loop of the hybrid model is illustrated in FIG. 15 where the meshes M1 and M2 respectively represent the first and second parts of the volume mesh.

It is clear that the internal forces module 16 takes account of the deletions and additions of links and/or of nodes when it uses the hybrid model. Consequently, the node and link tensors used in the first masses/tensors technique are updated in real time.

As soon as the calculation of the internal forces and displacements is regarded by the internal forces module 16 as having terminated for a value of the vector displacement of the tool, the said refresh module 17 proceeds to the determination of the new image data of the object and of the embodying of the tool with a view to their display, whilst at the same time, the internal forces module 16 recommences a new calculation with a new vector displacement of the tool, possibly applied to nodes other than those to which they were initially applied.

It is clear that in the case of a hybrid model, it is particularly advantageous for the collision module to define subtables of multiplets for each part of the volume mesh cell. Moreover, it is particularly advantageous, in a desire for accuracy when detecting the points of collision, for the multiplets of the subtables to be updated alongside the alterations (deformation) of the various parts of the volume mesh cell.

The device according to the invention can be implanted in a memory, for example a mass memory, of one or more means of calculation of the work station and/or computer type, in the form of software modules.

For all useful purposes, it is specified that more detailed descriptive elements are indicated in the doctoral thesis by S. Cotin, <<Modèles anatomiques déformables en temps-réel—Application à la simulation de chirurgie avec retour d'effort>> [Real-time deformable anatomical models—Application to the simulation of surgery with force feedback], submitted on Nov. 19, 1997, as well as in the already cited publication <<Real-time non linear elastic deformations of soft tissues for surgery simulation>>, by S. Cotin, H. Delingette and N. Ayache. These documents will be made public after the present Patent Application has been filed.

The invention is not limited to the embodiments described above, merely by way of example, but it encompasses all the variants which could be envisaged by the person skilled in the art within the scope of the Claims below.

Thus, a 3D image processing device, and the associated process, have been described, in which the action on a tool was induced by the maneuvering of a <<joystick>> by an operator, then defined by the user interface. However, it would be possible to envisage the action on the tool being defined directly by the user interface, this action being stored and decomposable into elementary subactions, the operator now intervening only so as to decide on the choice of certain elementary subactions, for example with a view to training (or learning).

Moreover, devices and the associated process have been described, which are intended for processing images, especially medical, and in particular of the liver. However, it is clear that the invention is not limited to this field alone. It applies also to sectors other than the medical field, as well as to non-medical fields in which the real-time processing of images of 3D objects on which a simulation of intervention, in the widest sense of the term, is of particular benefit equally in regard to the teaching of intervention techniques as in regard to the improving or tailoring of new intervention techniques.

Additionally, processing models have been described in which the matrices and tensors were calculated on the basis of a volume linear elastic deformation law. However, other types of deformation laws may be used, and in particular laws of the non-linear type.

Lastly, a <<hybrid>> model has been described which calls upon two different techniques, a first technique of real-time calculation referred to as <<masses/tensors>>, the second technique being, in the example chosen, a so-called <<precalculations>> real-time calculation technique relying on a finite element approach. However, it is clear that any other second technique could be envisaged, whether or not it calls upon precalculations, provided that it allows image data processing compatible with a dynamic simulation of a real-time intervention.

Appendix $$\text{code}=x+y*N_{blocks\ x}+z*N_{blocks\ y}*N_{blocks\ x}$$

$$x=\text{int}\left(\frac{Px-b\min_x}{block_{width\,x}}\right)$$

$$y=\text{int}\left(\frac{Py-b\min_y}{block_{width\,y}}\right)$$

$$z=\text{int}\left(\frac{Pz-b\min_z}{block_{width\,z}}\right)$$

Formulae (1):

<<int>>: function giving the integer part of its argument, $b\min_i$ (i=x,y,z): lower bounds on the space encompassing the object, $block_{width\ i}$ (i=x,y,z): dimensions of a volume block, $N_{blocks\ i}$ (i=x,y): number of volume blocks in the x and y directions in space.

Formula (2):

$$F_i^{int}(t)=[M]u$$

u: vector of dimension $3*(N_v+1)$ representing the displacement of node $N_i$ and of its neighbors, $N_v$: number of neighbors of node $N_i$, and

[M]: deformation matrix of dimension 3*3*(NV+1) representing the deformation law of the object (known otherwise).

Formula (3):

$$F_i^{int}=[T_{ii}]\Delta x_i+\sum_{j\in v}[T_{ij}]\Delta x_j$$

Formula (4):

$$[K^e]=\text{Volume}(T)[\Gamma_T]^t[E_T][\Gamma_T]$$

$[E_T]$ is, for example, given by the matrix:

$$[E_T]=\begin{vmatrix}
\lambda+2\mu & 0 & 0 & 0 & \lambda & 0 & 0 & 0 & \lambda\\
0 & \mu & 0 & \mu & 0 & 0 & 0 & 0 & 0\\
0 & 0 & \mu & 0 & 0 & 0 & \mu & 0 & 0\\
0 & \mu & 0 & \mu & 0 & 0 & 0 & 0 & 0\\
\lambda & 0 & 0 & 0 & \lambda+2\mu & 0 & 0 & 0 & \lambda\\
0 & 0 & 0 & 0 & 0 & \mu & 0 & \mu & 0\\
0 & 0 & \mu & 0 & 0 & 0 & \mu & 0 & 0\\
0 & 0 & 0 & 0 & 0 & \mu & 0 & \mu & 0\\
\lambda & 0 & 0 & 0 & \lambda & 0 & 0 & 0 & \lambda+2\mu
\end{vmatrix}$$

λ and u: LAMÉcoefficients, $[\Gamma_T]^t$ is given, for example, by the matrix:

$$[T_T]^t=\begin{vmatrix}
a11 & a12 & a22 & 0 & 0 & 0 & 0 & 0 & 0\\
a21 & a22 & a23 & 0 & 0 & 0 & 0 & 0 & 0\\
a31 & a32 & a33 & 0 & 0 & 0 & 0 & 0 & 0\\
a41 & a42 & a43 & 0 & 0 & 0 & 0 & 0 & 0\\
0 & 0 & 0 & a11 & a12 & a22 & 0 & 0 & 0\\
0 & 0 & 0 & a21 & a22 & a23 & 0 & 0 & 0\\
0 & 0 & 0 & a31 & a32 & a33 & 0 & 0 & 0\\
0 & 0 & 0 & a41 & a42 & a43 & 0 & 0 & 0\\
0 & 0 & 0 & 0 & 0 & 0 & a11 & a12 & a22\\
0 & 0 & 0 & 0 & 0 & 0 & a21 & a22 & a23\\
0 & 0 & 0 & 0 & 0 & 0 & a31 & a32 & a33\\
0 & 0 & 0 & 0 & 0 & 0 & a41 & a42 & a43
\end{vmatrix}$$

$\alpha_{ji}$ first partial derivatives of the barycentric coordinates $\lambda_j(x)$ of a point x situated inside a tetrahedron T:

$$\frac{\delta\lambda_j(x)}{\delta x_i}=\alpha_{ji},\quad i=1,2,3;\quad j=1,2,3,4$$

Formulae (5):

a) for the force tensor $[T_{ij}]$:

$$T_{k,l}\leftarrow T_{k,l}+\sum_{i=1}^{4}K^e_{s_i+4k,s_i+4l};\quad k=1,2,3;\quad l=1,2,3$$

$s_i$=local $(m_i)$: local index of node $N_i$,

<<local>>: transfer function assigning a local index (lying between 1 and 4 in the case of a tetrahedron and corresponding to one of the four vertices of T) to node $N_i$ represented here by its mass $m_i$.

b) for the link tensor $[T_{ij}]$:

$$T_{k,l}\leftarrow T_{k,l}+\sum_{i,j=1}^{4}K^e_{s_i+4k,s_j+4l};\quad k=1,2,3;\quad l=1,2,3$$

$s_i$=local $(m_i)$ and $s_j$=local $(m_j)$

Formula (6):

$$F_i^{tension}=\sum_{(i,j)\in v}\left\{-K_{(i,j)}(l(t)-\alpha_0)\frac{l_{ij}}{l(t)}+\right.$$

-continued $$k^{d}_{(i,j)}\left(\frac{\partial l}{\partial t}\right)\frac{l_{ij}}{l(t)}$$

if i and j s $F_i^{tension}=0$ otherwise $\alpha_0<l_0$, where $l_0$ is the unloaded length of a spring whose stiffness is chosen according to the magnitude of the amplification desired.

Formula (7):

$$F_i^{int}=[T_{ij}]\Delta x_i+\sum_{j\in v}[T_{ij}]\Delta x_j+F_i^{tension}$$

Formula (8):

$$F_i(t)=m_i a_i(t)=F_i^{int}(t)+F_i^{ext}(t)$$

Formula (9):

$$x_i+1x_i+\Delta t*f(x_i,t_i)$$

Formulae (10):

$$v_{i+1}=v_i+\Delta t*a_i$$

$$P_{i+1}=P_i+\Delta t*v_i$$

$P_i$: position of node N at the instant $t_i$.

Formulae (11):

$$\delta x_1=\Delta t\cdot f(x_i,t_i)$$

$$\delta x_2=\Delta t\cdot f(x_i\tfrac{1}{2}\delta x_1,t_i+\tfrac{1}{2}\Delta t)$$

$$\delta x_3=\Delta t\cdot f(x_i\tfrac{1}{2}\delta x_2,t_i+\tfrac{1}{2}\Delta t)$$

$$\delta x_4=\Delta t\cdot f(x_i+\delta x_3,t_i+\Delta t)$$

$$x_{i+1}=x_i+\tfrac{1}{6}\delta x_1+\tfrac{1}{3}\delta x_2+\tfrac{1}{3}\delta x_3+\tfrac{1}{6}\delta x_4$$

the velocity $v(t+\Delta t)=v_{i+1}$ and the position $P(t+\Delta t)=P_{i+1}$ are deduced from the acceleration $a_i$ through the following equations:

$$\delta v_1=\Delta t\cdot a_i$$

$$\delta P_1=\Delta t\cdot v_i$$

$$\delta v_2=\Delta t\cdot a'_i$$

$$\delta P_2=\Delta t\cdot v'_i$$

$$\delta v_3=\Delta t\cdot a''_i$$

$$\delta P_3=\Delta t\cdot v''_i$$

$$\delta v_4=\Delta t\cdot a'''_i$$

$$\delta P_4=\Delta t\cdot v'''_i$$

$$v_{i+1}=v_i+\tfrac{1}{6}\delta v_1+\tfrac{1}{3}\delta v_2+\tfrac{1}{3}\delta v_3+\tfrac{1}{6}\delta v_4$$

$$P_{i+1}=P_i+\tfrac{1}{6}\delta P_1+\tfrac{1}{3}\delta P_2+\tfrac{1}{3}\delta P_3+\tfrac{1}{6}\delta P_4$$

$a'_i$, $a''_i$ and $a'''_i$: accelerations calculated respectively from the <<intermediate>> positions $\delta P_1$, $\delta P_2$ and $\delta P_3$.

What is claimed is:

1. An improved electronic device for processing image data, of the type that includes a user interface (4) capable of generating a force feedback, in accordance with the reactions of a tool (6, 7), an internal forces module (16) able, on designation of a 3D object appearing in a set of image data, to establish a field of internal forces between nodes (N) of a volume meshing dependent on a surface meshing of this object, on the basis of a deformation law and of an action defined by the user interface (4) and representative of a maneuver of the said tool, wherein the volume meshing includes links between the nodes thereof, and additionally includes volume mesh cells that are defined by the notes and the links, and a reaction module (20) for determining a reaction force of the object which corresponds to its deformation estimated on the basis of the internal forces, so that the force generated by the user interface (4) is substantially balanced by this reaction force, and a refresh module (17) for calculating new image data of the object, in the presence of its estimated deformations supplemented with a representation of the said tool, wherein the improvement comprises:

a collision module (18) able to estimate a point of intersection between a straight line embodying a displacement derived from the said defined action and the said surface meshing, wherein the internal forces module (16) is devised so as to estimate the internal force exerted on each node of a first part at least of the volume meshing of the object on the basis of the said displacement applied to the nodes belonging to a surface mesh cell containing the said point of intersection, of boundary conditions, and of node tensors and link tensors emanating respectively for each node and each link of this first part at least, from stiffness matrices specific to each volume mesh cell of at least the said first part and dependent on the deformation law.

2. Device according to claim 1, further comprising a meshing module able to designate the said 3D object by determination of an external envelope, then to decompose the said envelope into the said surface mesh cells with a view to the decomposing of the internal volume of the envelope into the said volume mesh cells.

3. Device according to claim 2, wherein the said external envelope is obtained by a method of segmentation.

4. Device according to claim 2, wherein the said surface mesh cells are triangles.

5. Device according to claim 4, wherein the said volume mesh cells are tetrahedra formed from the triangular surface mesh cells.

6. Device according to claim 5, wherein the said volume mesh cells are obtained by a Delaunay-Voronoi method.

7. Device according to claim 2, wherein the internal forces module (16) is devised so as to calculate the stiffness matrices of each volume mesh cell, as well as the said node tensors and link tensors.

8. Device according to claim 1, wherein the said deformation law is a volume linear elastic law.

9. Device according to claim 1, wherein the internal forces module (16) is devised so as to calculate the internal force exerted on each node of the said first part of the volume meshing on the basis of the product of its node tensor and the estimated displacement of this node, and of a summation, over the set of neighboring nodes possessing a link with the said node, of the product of the link tensor, associated with the link between the neighboring node and the said node, and of the estimated displacement of this neighboring node.

10. Device according to claim 1, wherein the said internal forces module (16) is able to determine the internal forces exerted on some at least of the nodes of the first part of the volume meshing on the basis of the deformation law and of auxiliary surface forces dependent on stored, chosen parameters of the said object.

11. Device according to claim 1, wherein the said internal forces module (16) is able to estimate the displacements of the nodes of the volume meshing on the basis of the displacement derived from the defined action and from at least one external force.

12. Device according to claim 1, wherein the said estimated displacements of the nodes, other than those of the said surface mesh cell comprising the said point of intersection, are obtained by a method chosen from among at least the Euler method and the Runge-Kutta method.

13. Device according to claim 12, wherein the said deformation is obtained by the so-called order 4 Runge-Kutta method.

14. Device according to claim 1, wherein the said internal forces module (16) is able, after determining the estimated displacements of the nodes, to delete at least one link between neighboring nodes or a volume mesh cell as a function of a first criterion, then to update the node tensors and the link tensors as a function of the deleted link(s), and lastly to recalculate the internal forces of the nodes of at least the first part of the volume meshing.

15. Device according to claim 14, wherein the first criterion pertains to at least one parameter chosen from among at least one cue transmitted by the said user interface (4) and relating to the type of tool (6, 7) maneuvered, a volume variation of the volume mesh cell comprising the said link or the said volume mesh cell to be deleted, and a length variation of a link of the volume mesh cell comprising the said link to be deleted.

16. Device according to claim 15, wherein the said internal forces module (16) is able, after determining the estimated displacements of the nodes, to delete a node in the event of detecting the deletion of all the links which join the said node to the neighboring nodes or as a function of the said first criterion, then to update the node tensors and the link tensors as a function of the node and of the deleted links, and lastly to recalculate the internal forces of the nodes of at least the first part of the volume meshing.

17. Device according to claim 16, wherein the said internal forces module (16) is able, in the event of the deletion of a link and/or of a node and before updating the link tensors and node tensors, to add new nodes and new links in such a way as to remesh the said volume meshing.

18. Device according to claim 1, wherein the internal forces module (16) is devised so as to estimate the internal force exerted on each node of the said volume meshing of the said object.

19. Device according to claim 1, wherein the internal forces module (16) is able to determine the internal forces exerted on the nodes of at least a second part of the said volume meshing on the basis of boundary conditions defined by so-called connection nodes placed at an interface between the first and second parts, and of a table of deformation tensors, each tensor of which is representative of the influence of an elementary displacement of each node of at least the said second part on each other node of at least this second part.

20. Device according to claim 19, wherein boundary conditions serving in the calculation of the internal forces of the second part are defined by the internal forces calculated for the said connection nodes in the guise of nodes of the first part.

21. Device according to claim 20, wherein the internal forces module (16) is devised so as to deduce from the values of the internal forces exerted on the nodes of the second part of the volume meshing, values of displacement of the connection nodes in such a way as to provide boundary conditions which in turn make it possible to calculate the internal forces of the nodes of the first part.

22. Device according to claim 21, wherein the internal forces module (16) is able to recalculate the values of the internal forces exerted on the nodes of the first and second parts of the volume meshing on the basis of the boundary conditions determined in succession on the connection nodes, until a position of so-called equilibrium of the internal forces of the said connection nodes is obtained.

23. Device according to claim 19, wherein the parts of the volume meshing are determined on the basis of a predetermined criterion pertaining at least to a parameter of the image data of the said object chosen from among physical parameters and anatomical parameters.

24. Device according to claim 19, wherein the second part is complementary to the said first part.

25. Device according to claim 19, further comprising a partitioning module able to subdivide the said volume meshing into the said parts, including the said first and 20 second parts.

26. Device according to claim 1, wherein the said collision module (18) is able to determine a collision between at least two tools managed by the said user interface (4).

27. Device according to claim 26, wherein each tool comprises at least one end (7) which interacts with the object and is represented by at least one point.

28. Device according to claim 27, wherein each tool has a shank that is represented by a multiplicity of points joined to one another as well as to the end(s) (7), by segments.

29. Device according to claim 27, wherein the said collision module (18) is able to create a three-dimensional space encompassing the external envelope of the said object, then to decompose the said space into volume blocks, the number of which is chosen so that each block comprises a number of node of the said volume meshing of the object substantially equal to the number of nodes of the other blocks, each block intersecting the said external surface comprising at least one node, and lastly to store in multiplets the coordinates of each node with reference to the volume block which encompasses it.

30. Device according to claim 29, wherein the said collision module (18) is able, for each tool, to determine the presence of a point of the tool in the said space through a comparison between the said multiplets and the coordinates of the said point, then the volume block of the said space in which the said point lies.

31. Device according to claim 30, wherein the said collision module (18) is able, for each tool, to determine the distance which separates the said point from the said node(s) encompassed in the said volume block so as to determine the smallest of these distances, termed the minimum distance, then to determine the distance which separates the said point from the said node(s) encompassed in a predetermined number of volume blocks neighboring the volume block in which it lies so as to compare its distances with the said minimum distance, then to determine the collection of surface mesh cells adjacent to the node associated with the said minimum distance so as to determine whether a segment defined by the said position of the point of the tool and by its previous position intersects one at least of these adjacent surface mesh cells, thus making it possible to estimate the barycentric coordinates of the point of collision between the said object and the said tool, with a view to their transmission to the said internal forces module (16).

32. Device according to claim 31, wherein the collision detection module (18) is able, for each tool, to modify the contents of the said multiplets between two determinations of presence of points inside the said volume blocks, in the event of detection of a deformation by the said internal forces module (16).

33. Device according to claim 1, wherein the user interface (4) comprises a harness (5) maneuverable by at least one operator hand so as to simulate the maneuvering of the said tool.

34. Device according to claim 1, further comprising display means (3) coupled to the refresh module (17) for displaying in real time in image form at least the image data of the object and of a representation of the tool.

35. Device according to claim 1, wherein the set of image data represents a three-dimensional digital image of a region including the 3D object.

36. Device according to claim 35, wherein the digital image is a medical image.

37. An improved electronic process for processing image data, of the type that includes the steps of providing a user interface (4) capable of generating a force feedback, in accordance with the reactions of a tool (6, 7), establishing, on the basis of a deformation law and of an action defined by the user interface (4) and representative of a maneuver of the said tool, a field of internal forces between nodes of a volume meshing dependent on a surface meshing of a 3D object appearing in a set of image data, wherein the volume meshing includes links between the nodes thereof, and additionally includes mesh cells that are defined by the nodes and the links, determining the reaction force of the object which corresponds to its deformation estimated on the basis of the internal forces, so that the force generated by the user interface (4) is substantially balanced by this reaction force, and calculating new image data of the object, in the presence of the estimated deformations supplemented with the representation of the said tool, wherein the improvement comprises:

estimating a point of intersection between a straight line embodying a displacement derived from the said defined action and the said surface meshing is estimated, and estimating the internal force exerted on the nodes of a first part at least of the volume meshing of the object, on the basis of the displacement applied to the nodes belonging to the surface mesh cell containing the said point of intersection, of boundary conditions, and of node tensors and link tensors emanating respectively for each node and each link of this part at least, from stiffness matrices specific to each volume mesh cell of at least the said first part and dependent on the deformation law.

38. Device according to claim 3, wherein the method of segmentation comprises extracting iso-surfaces.

39. Device according to claim 11, wherein the at least one external force comprises gravitational force.

40. Device according to claim 23, wherein the parameter of the image data is intensity.

41. Device according to claim 35, wherein the region additionally includes at least one further 3D object.

42. An improved method for permitting a user to manipulate a 3D virtual object with the aid of a user interface that senses movement of a tool by the user and that provides force feedback to the user, the virtual object appearing in a set of image data and having a surface meshing and a volume meshing, said method being of the type that includes establishing, on the basis of a deformation law, a field of internal forces between nodes of the volume meshing when the virtual object is deformed by the tool;

determining a reaction force that is to be exerted by the user interface when the virtual object is deformed by the tool, the deformation of the virtual object being estimated at least in part on the basis of the internal forces; and calculating new image data of the object, in the presence of the estimated deformation supplemented with a representation of the tool;

wherein the improvement comprises:

estimating a point of intersection between a straight line embodying a displacement of the tool and the surface meshing, wherein the internal force exerted on the nodes of a part of at least the volume meshing of the virtual object is estimated on the basis of at least one factor, the at least one factor including a displacement applied to the nodes belonging to a surface mesh cell containing the point of intersection.

* * * * *